(12) United States Patent
Hao et al.

(10) Patent No.: US 12,259,922 B2
(45) Date of Patent: Mar. 25, 2025

(54) SEARCH RESULT FEEDBACK METHOD AND APPARATUS, AND STORAGE MEDIUM

(71) Applicant: HUAWEI TECHNOLOGIES CO., LTD., Guangdong (CN)

(72) Inventors: Lei Hao, Shenzhen (CN); Yu Wang, Xi'an (CN); Min Wang, Shenzhen (CN); Songcen Xu, Shenzhen (CN); Weicai Zhong, Xi'an (CN); Zhenhua Zhao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/548,039

(22) PCT Filed: Dec. 20, 2021

(86) PCT No.: PCT/CN2021/139762
§ 371 (c)(1),
(2) Date: Aug. 25, 2023

(87) PCT Pub. No.: WO2022/179271
PCT Pub. Date: Sep. 1, 2022

(65) Prior Publication Data
US 2024/0126808 A1    Apr. 18, 2024

(30) Foreign Application Priority Data
Feb. 26, 2021    (CN) .......................... 202110222937.3

(51) Int. Cl.
*G06F 16/53* (2019.01)
*G06F 16/538* (2019.01)
*G06F 16/583* (2019.01)

(52) U.S. Cl.
CPC ........ *G06F 16/538* (2019.01); *G06F 16/5854* (2019.01)

(58) Field of Classification Search
CPC .. G06F 16/538; G06F 16/5854; G06F 16/583; G06F 16/535; G06N 3/045;
(Continued)

(56) References Cited

U.S. PATENT DOCUMENTS 9,171,018 B2    10/2015   Ovsjanikov et al.
10,140,515 B1 *  11/2018   Waldo .................. G06F 16/639
(Continued)

FOREIGN PATENT DOCUMENTS

CN    103119593 A    5/2013
CN    103412938 A    11/2013
(Continued)

OTHER PUBLICATIONS

[No Author Listed] [online], "MobileNetV3, a classic convolutional model," Mar. 12, 2020, retrieved on Sep. 13, 2024, retrieved from: URL<https://www.jianshu.com/p/562c57ad835c>, 7 pages (with English machine translation).
(Continued)

*Primary Examiner* — Etienne P Leroux
*Assistant Examiner* — Cindy Nguyen
(74) *Attorney, Agent, or Firm* — Fish & Richardson P.C.

(57) ABSTRACT

In one example method, a first image including M objects is obtained. For N objects in the M objects, when N is greater than or equal to 2, arrangement orders of the N objects is determined, where an arrangement order of any one of the N objects is determined based on at least one of a scene intent weight, a confidence score, or an object relationship score. The scene intent weight is used to indicate a probability that the any object is searched in a scene corresponding to the first image, the confidence score is a similarity between the any object and an image in an image library, and the object relationship score is used to indicate importance of the any object in the first image. Search results of some
(Continued)

or all of the N objects are fed back according to the arrangement orders of the N objects.

20 Claims, 16 Drawing Sheets

(58) Field of Classification Search
CPC ........ G06N 3/0464; G06N 3/09; G06V 10/25; G06V 10/74; G06V 10/764
See application file for complete search history.

(56) References Cited

U.S. PATENT DOCUMENTS

| | | |
|---|---|---|
| 2019/0354609 A1 | 11/2019 | Huang et al. |
| 2020/0413070 A1* | 12/2020 | Huang .................... H04N 19/17 |
| 2021/0165818 A1* | 6/2021 | Matsushita ............. G06F 16/55 |

FOREIGN PATENT DOCUMENTS

| | | |
|---|---|---|
| CN | 111143543 A | 5/2020 |
| CN | 112287234 A | 1/2021 |
| WO | 2009146113 A2 | 12/2009 |
| WO | 2020018210 A1 | 1/2020 |

OTHER PUBLICATIONS

Extended European Search Report in European Appln No. 21927695.3, dated May 8, 2024, 9 pages.
International Search Report and Written Opinion in International Appln. No. PCT/CN2021/139762, mailed on Mar. 15, 2022, 16 pages (with English translation).

* cited by examiner (a)                        (b)

SEARCH RESULT FEEDBACK METHOD AND APPARATUS, AND STORAGE MEDIUM

CROSS-REFERENCE TO RELATED APPLICATIONS

This application is a national stage of International Application No. PCT/CN2021/139762, filed on Dec. 20, 2021, which claims priority to Chinese Patent Application No. 202110222937.3 filed on Feb. 26, 2021. Both of the aforementioned applications are hereby incorporated by reference in their entireties.

TECHNICAL FIELD

This application relates to the field of terminal technologies, and in particular, to a search result feedback method and apparatus, and a storage medium.

BACKGROUND

Visual search is to search by using an image as a search input source, to obtain various search results, such as a related image and text, of an object in an image. A growing quantity of users implement a search requirement for some objects on an electronic device by using a visual search technology.

Currently, in a visual search process, an electronic device obtains an image, and then performs image detection processing on the image to determine one or more objects in the image. The electronic device searches for the determined object to obtain a search result. After obtaining the search result, the electronic device feeds back the search result of each object to the user according to an arrangement order of each object in the image.

However, the search result fed back to the user is a search result of each object in the first image, and the feedback is poorly targeted. Consequently, accuracy of the search result finally fed back to the user is relatively low.

SUMMARY

This application provides a search result feedback method and apparatus, and a storage medium, so as to resolve a problem in a conventional technology that accuracy of a search result fed back to a user is relatively low.

To achieve the foregoing objective, the following technical solutions are used in this application.

According to a first aspect, a search result feedback method is provided, where the method includes:
obtaining a first image, where the first image includes M objects, and M is an integer greater than or equal to 2;
for N objects in the M objects, when N is greater than or equal to 2, determining arrangement orders of the N objects, where N is a positive integer less than or equal to M; where
an arrangement order of any one of the N objects is determined based on any one or more of a scene intent weight, a confidence score, and an object relationship score, where the scene intent weight is used to indicate a probability that the any object is searched in a scene corresponding to the first image, the confidence score is a similarity between the any object and an image in an image library, and the object relationship score is used to indicate importance of the any object in the first image; and
feeding back search results of some or all of the N objects according to the arrangement orders of the N objects.

In this application, the N objects are screened and sorted according to the arrangement orders of the N objects, so as to preferentially feed back, to a user, a search result of an object that has a good search result and that the user may be interested in, so that feedback is targeted to some extent, thereby improving accuracy of the search result that is finally fed back.

In an example in this application, any one or more of the scene intent weight, the confidence score, and the object relationship score of any one of the N objects are determined in the following manner:
performing image detection processing on the first image by using a target detection model, to obtain an object area of a first object in the first image and/or an object category of the first object, where the first object is any one of the N objects; and
determining a confidence score of the first object based on the object area of the first object in the first image and the object category of the first object, and/or determining an object relationship score of the first object based on the object area of the first object in the first image, and/or determining a scene intent weight of the first object based on the object category of the first object.

In this application, image detection processing is performed on the first image by using the target detection model, to obtain the object area and/or the object category of the first object in the first image, so as to determine at least one of the scene intent weight, the confidence score, and the object relationship score of the first object based on the image area and/or the object category of the first object; and then the objects in the first image may be screened and sorted by using at least one of the scene intent weight, the confidence score, and the object relationship score, so as to accurately feed back objects that the user may be interested in.

In an example in this application, determining a confidence score of the first object based on the object area of the first object in the first image and the object category of the first object includes:
determining an image library corresponding to the object category of the first object;
determining a similarity between the object area of the first object in the first image and each of a plurality of images included in the image library; and
using a maximum similarity in a plurality of determined similarities as the confidence score of the first object.

In this way, a search object is screened from the first image based on the confidence score, so that intent understanding corresponds to a search result, and accuracy of intent search can be improved.

In an example in this application, the first image includes a plurality of areas, each of the plurality of areas has a preset score used to indicate position importance of the area, and preset scores of at least two of the plurality of areas are different; and
the determining an object relationship score of the first object based on the object area of the first object in the first image includes:
determining a position importance value of the first object in the first image based on a preset score of each area included in the object area of the first object in the first image; and
determining the object relationship score of the first object based on the position importance value of the first object.

The position importance values of the N objects in the first image in a two-dimensional space are determined, the object relationship score is determined based on the position importance values, and the search object is screened from the first image based on the object relationship score, so that intent search is performed only on a relatively important object in the first image, a search result of a search object that the user is interested in is provided for the user, and user experience can be improved.

In an example in this application, the determining the object relationship score of the first object based on the position importance value of the first object includes:

when the first image includes a reference object, obtaining, based on the object area of the first object in the first image and an object area of the reference object in the first image, a distance between the first object and the reference object in the first image, and using the distance as an affiliation value of the first object; and the determining the object relationship score of the first object based on the position importance value of the first object includes:

determining the object relationship score of the first object based on the position importance value and the affiliation value that are of the first object.

The position importance values of the N objects in the first image in the two-dimensional space are determined, the value of an affiliation between each object and the reference object is determined, and then the object relationship score of each object is determined based on the position importance value and the affiliation value, so that the search intent of the object is associated with an object attribute, and a search result of a search object that the user may be interested in is preferentially recommended to the user, thereby improving user experience.

In an example in this application, the determining a scene intent weight of the first object based on the object category of the first object includes:

determining a scene category of the first image; and determining the scene intent weight of the first object based on the scene category of the first image, the object category of the first object, and a correspondence between the scene category, the object category, and the scene intent weight.

The scene category of the first image is determined, and then search intent rankings of the search objects in the first image are determined based on the scene category, and the search results of the search objects in the first image are displayed based on the search intent rankings. In this way, the search result is combined with the scene, so that the search result is closer to the scene, and the search result is not separated from the scene of the first image, so that the search result displayed to the user is more suitable for the scene of the first image, and the search result that the user may be interested in is preferentially recommended to the user, thereby improving user experience.

In an example in this application, quality scores of the N objects in the first image are higher than or equal to a quality score threshold, and a quality score of the any object is determined based on blurriness and/or integrity of the any object.

Some objects with relatively poor image quality are filtered out, so that the intent understanding is associated with an object attribute, and search processing is not performed on some objects that do not match the search intent, thereby improving search effectiveness and accuracy, and improving user experience.

In an example in this application, the feeding back search results of some or all of the N objects according to the arrangement orders of the N objects includes:

obtaining object labels included in the search results of some or all of the N objects;

generating, based on the obtained object labels, inquiry information corresponding to some or all of the N objects, where the inquiry information is used to prompt whether information associated with the object label needs to be obtained; and displaying the inquiry information of some or all of the N objects according to the arrangement orders of the N objects, to feed back the search results of some or all of the N objects.

The inquiry information is generated based on the object labels, and the search results are fed back to the user by using the inquiry information. In this way, the user can quickly learn the feedback results, and simplicity of the feedback interface can be improved.

In an example in this application, the N objects include a second object and a third object, an arrangement order of the second object comes before an arrangement order of the third object, and a display order of a search result corresponding to the second object on the display comes before a display order of a search result corresponding to the third object on the display.

The search results of the objects with higher arrangement orders are preferentially displayed, that is, the search results of the objects with higher arrangement orders are preferentially displayed, so that the user can preferentially view the search results displayed in the front of the display, to preferentially feed back the search results of the objects that the user may be interested in, thereby improving user experience.

According to a second aspect, a search result feedback apparatus is provided, where the apparatus includes:

an obtaining module, configured to obtain a first image, where the first image includes M objects, and M is an integer greater than or equal to 2;

a determining module, configured to: for N objects in the M objects, when N is greater than or equal to 2, determining arrangement orders of the N objects, where N is a positive integer less than or equal to M; and an arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image; and a feedback module, configured to feed back search results of some or all of the N objects according to the arrangement orders of the N objects.

In an example in this application, the determining module is configured to:

perform image detection processing on the first image by using a target detection model, to obtain an object area of a first object in the first image and/or an object category of the first object, where the first object is any one of the N objects; and determine a confidence score of the first object based on the object area of the first object in the first image and the object category of the first object, and/or determine an object relationship score of the first object based on the object area of the first object in the first image, and/or determine a scene intent weight of the first object based on the object category of the first object.

In an example in this application, the determining module is configured to:
  determine an image library corresponding to the object category of the first object;
  determine a similarity between an object area of the first object in the first image and each of a plurality of images included in the image library; and
  use a maximum similarity in a plurality of determined similarities as the confidence score of the first object.

In an example in this application, the first image includes a plurality of areas, each of the plurality of areas has a preset score used to indicate position importance of the area, and preset scores of at least two of the plurality of areas are different; and the determining module is configured to:
  determine a position importance value of the first object in the first image based on a preset score of each area included in the object area of the first object in the first image; and
  determining the object relationship score of the first object based on the position importance value of the first object.

In an example in this application, the determining module is configured to:
  when the first image includes a reference object, obtain, based on the object area of the first object in the first image and an object area of the reference object in the first image, a distance between the first object and the reference object in the first image, and use the distance as an affiliation value of the first object; and
  determine the object relationship score of the first object based on the position importance value and the affiliation value that are of the first object.

In an example in this application, the determining module is configured to:
  determine a scene category of the first image; and
  determining the scene intent weight of the first object based on the scene category of the first image, the object category of the first object, and a correspondence between the scene category, the object category, and the scene intent weight.

In an example in this application, quality scores of the N objects in the first image are higher than or equal to a quality score threshold, and a quality score of the any object is determined based on blurriness and/or integrity of the any object.

In an example in this application, the feedback module is configured to:
  obtain object labels included in the search results of some or all of the N objects;
  generate, based on the obtained object labels, inquiry information corresponding to some or all of the N objects, where the inquiry information is used to prompt whether information associated with the object label needs to be obtained; and
  display the inquiry information of some or all of the N objects according to the arrangement orders of the N objects, to feed back the search results of some or all of the N objects.

In an example in this application, the N objects include a second object and a third object, an arrangement order of the second object comes before an arrangement order of the third object, and a display order of a search result corresponding to the second object on the display comes before a display order of a search result corresponding to the third object on the display.

According to a third aspect, an electronic device is provided, where the electronic device includes a processor and a memory in terms of structure; the memory is configured to store a program that supports the electronic device in performing the search result feedback method according to the first aspect, and store data used to implement the search result feedback method according to the first aspect; the processor is configured to execute the program stored in the memory; and the electronic device may further include a communication bus, where the communication bus is configured to establish a connection between the processor and the memory.

According to a fourth aspect, a computer-readable storage medium is provided. The computer-readable storage medium stores instructions, and when the instructions are run on a computer, the computer is enabled to perform the method according to the first aspect.

According to a fifth aspect, a computer program product that includes instructions is provided. When the computer program product runs on a computer, the computer is configured to perform the search result feedback method according to the first aspect.

Technical effects obtained in the second aspect, the third aspect, the fourth aspect, and the fifth aspect are similar to the technical effects obtained by using corresponding technical means in the first aspect. Details are not described herein again.

The technical solutions provided in this application can bring at least the following beneficial effects:

The first image is obtained, where the first image includes M objects, and M is an integer greater than or equal to 2; and for the N objects in the M objects, when there are a plurality of N objects, arrangement orders of the N objects are determined, and search results of some or all of the N objects are fed back according to the arrangement orders of the N objects; where an arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image. In this way, the N objects are screened and sorted according to the arrangement orders of the N objects, so as to preferentially feed back, to a user, a search result of an object that has a good search result and that the user may be interested in, so that feedback is targeted to some extent, thereby improving accuracy of the search result that is finally fed back.

DESCRIPTION OF EMBODIMENTS

To make the objectives, technical solutions, and advantages of this application clearer, the following further describes the implementations of this application in detail with reference to the accompanying drawings.

It should be understood that "a plurality of" mentioned in this application means two or more. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in the embodiments of this application, terms such as "first" and "second", are used to distinguish the same or similar items with substantially the same function and effect. A person skilled in the art may understand that the words such as "first" and "second" do not limit a quantity or an execution sequence, and the words such as "first" and "second" do not indicate a definite difference.

Methods provided in embodiments of this application may be applied to an electronic device. In an embodiment, an application (application, APP) having a visual search function may be installed and run on the electronic device. For example, the application may be a shopping application, a celebrity search application, or a browser. In an example, the electronic device may be a device such as a wearable device or a terminal device. For example, the wearable device may include but is not limited to a smartwatch, a smart band, a smart brooch, a pair of smart goggles, and a pair of smart glasses. The terminal device may include but is not limited to a mobile phone, a tablet computer, an augmented reality (augmented reality, AR)/virtual reality (virtual reality, VR) device, an ultra-mobile personal computer (ultra-mobile personal computer, UMPC), a notebook computer, a netbook, and a personal digital assistant (personal digital assistant, PDA).

Figure 1:
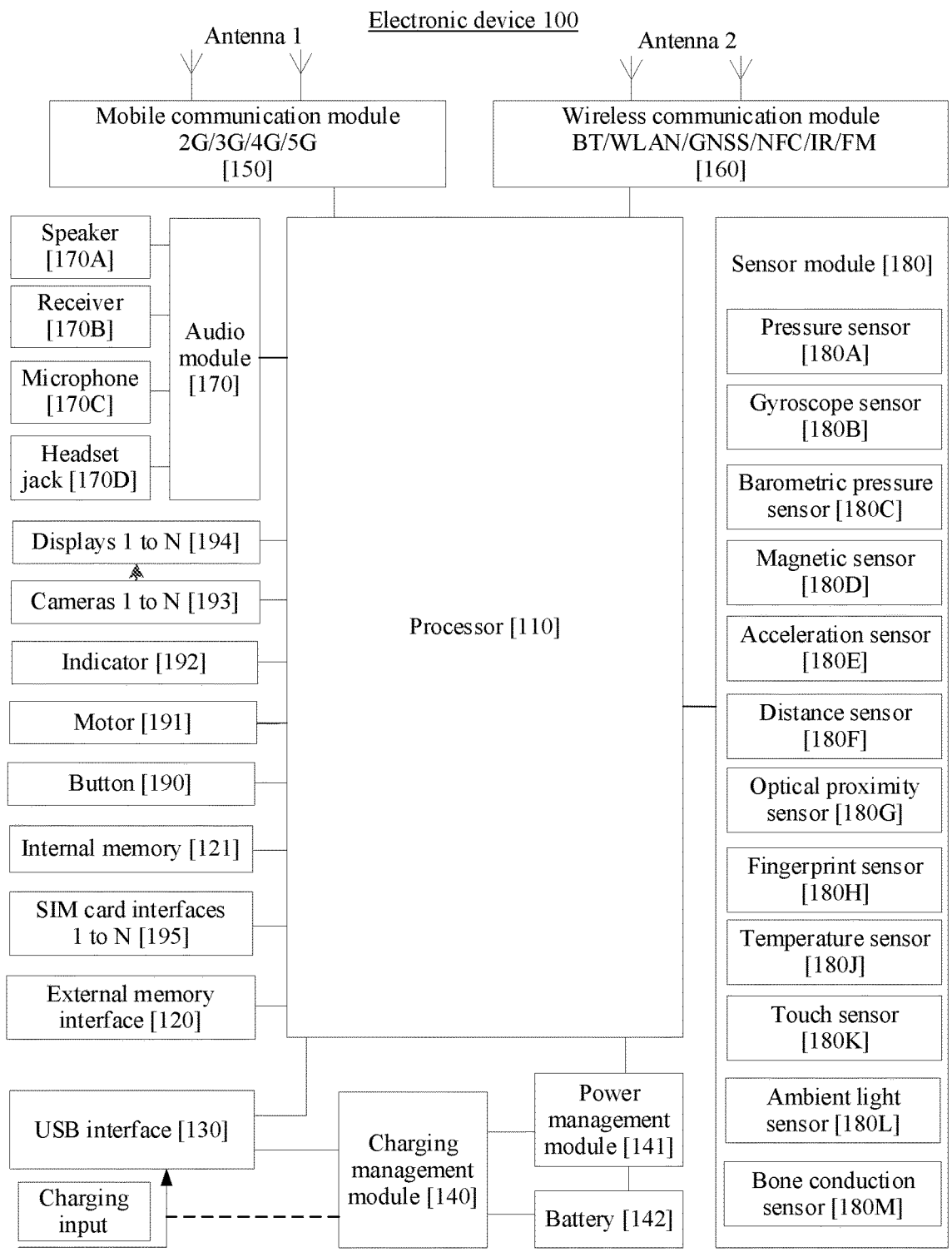
FIG. 1 is a schematic diagram of a structure of an electronic device according to an embodiment of this application.

FIG. 1 is a schematic diagram of a structure of an electronic device according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a shooting function of the electronic device 100. The processor 110 communicates with the display 194 by using the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules shown in embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health state (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same component as the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the electronic device 100 may include one or N displays 194, where N is a positive integer greater than 1.

The electronic device 100 may implement a shooting function by using the camera 193, the ISP, the video codec, the GPU, the display 194, the application processor and the like.

The ISP is configured to process data fed back by the camera 193. For example, during shooting, a shutter is pressed, and light is transmitted to a photosensitive element of the camera by using a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required for at least one function (such as a sound playing function and an image display function), and the like. The data storage area may store data (for example, audio data or an address book) created during use of the electronic device 100, and the like. In addition, the internal memory 121 may include a high-speed random access memory, or may include a nonvolatile memory such as at least one disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may be corresponding to different operation instructions. For example, when a touch operation whose touch operation intensity is lower than a first pressure threshold is performed on a messaging application icon, an instruction for viewing an SMS message is performed. When a touch operation whose touch operation intensity is higher than or equal to the first pressure threshold is performed on the messaging application icon, an instruction for creating a new SMS message is performed.

The gyroscope sensor 180B may be configured to determine a moving posture of the electronic device 100. In some embodiments, an angular velocity of the electronic device 100 around three axes (namely, x, y, and z axes) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse movement, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100, and When the electronic device 100 is still, a magnitude and a direction of gravity may be detected. The acceleration sensor 180E may be further configured to identify a posture of the electronic device 100, and is used in an application such as switching between a landscape mode and a portrait mode or a pedometer.

The distance sensor 180F is configured to measure a distance. The electronic device 100 may measure the distance in an infrared manner or a laser manner. In some embodiments, in a shooting scenario, the electronic device 100 may measure a distance through the distance sensor 180F to implement quick focusing.

The optical proximity sensor 180G may include, for example, a light-emitting diode (LED), and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a holster mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 reduces performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, shooting and audio playback) may correspond to different vibration feedback effects. The motor 191 may also be corresponding to different vibration feedback effects for touch operations performed on different areas of the display 194. Different application scenarios (for example, a time reminder, information receiving, an alarm clock, and a game) may also be corresponding to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may also be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, an Android system with a layered architecture is used as an example to describe a software architecture of the electronic device 100.

Figure 2:
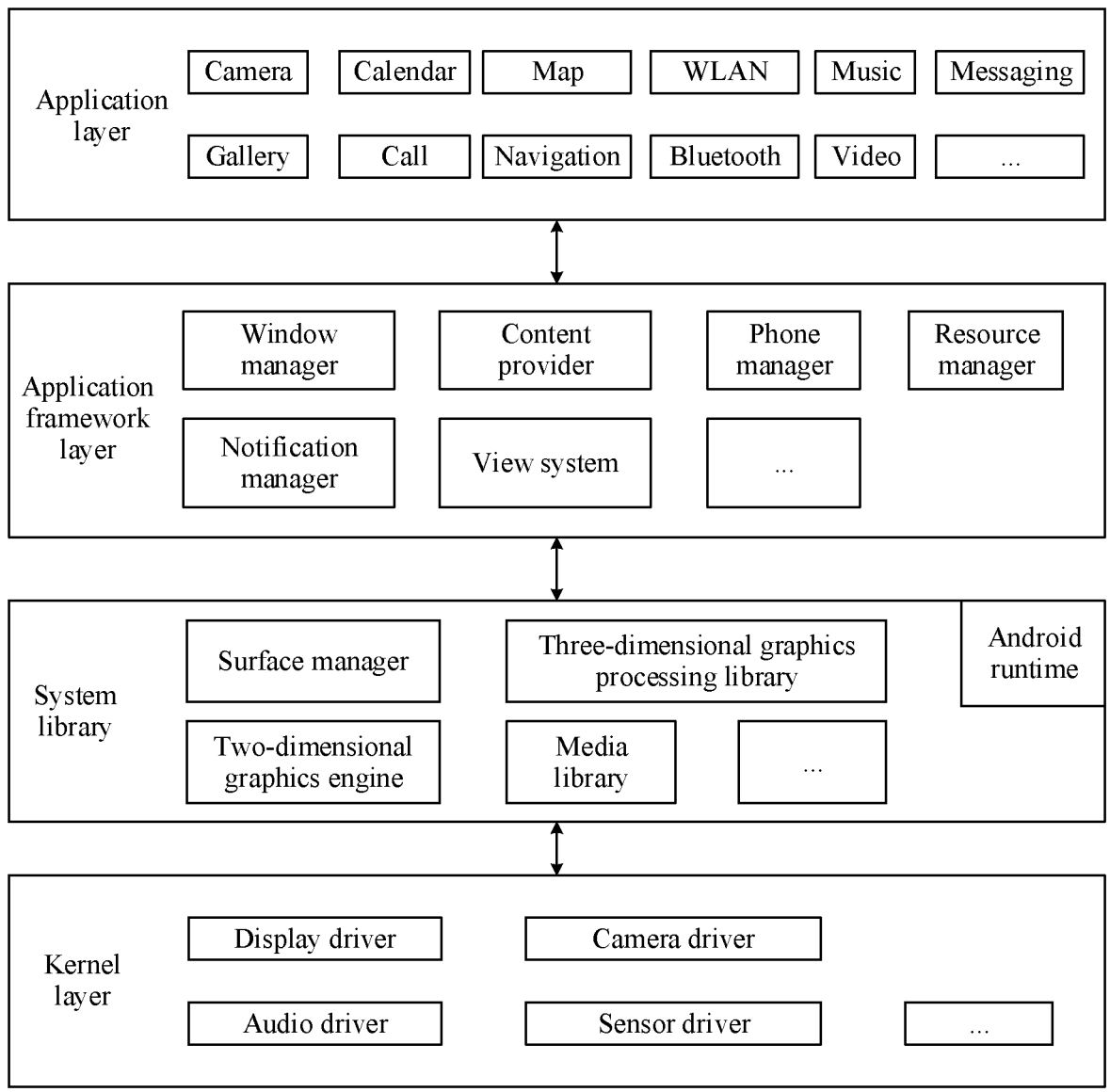
FIG. 2 is a block diagram of a software architecture of an electronic device according to an embodiment of this application.

FIG. 2 is a block diagram of a software architecture of the electronic device 100 according to an embodiment of this application.

In a layered architecture, software is divided into several layers, and each layer has a clear role and task. The layers communicate with each other through a software interface. In some embodiments, an Android system is divided into four layers from top to bottom: an application layer, an application framework layer, an Android runtime (Android runtime) and system library, and a kernel layer.

The application layer may include a series of application packages.

As shown in FIG. 2, the application packages may include applications such as Camera, Gallery, Calendar, Calls, Maps, Navigation, WLAN, Bluetooth, Music, Video, and Messaging. In addition, the application packages may further include an application having a visual search function.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is used to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be used to construct an application. A display interface may include one or more views. For example, a display interface including an SMS message notification icon may include a text display view and a picture display view.

The phone manager is used to provide a communication function for the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be used to convey a notification message. The notification manager may automatically disappear after a short pause without requiring a user interaction. For example, the notification manager is used to notify download completion, provide a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an alert sound is played, the electronic device vibrates, or the indicator light blinks.

The Android runtime includes a core library and a virtual machine. The Android runtime is responsible for scheduling and management of the Android system.

The core library includes two parts: a function that needs to be called in Java language and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, such as a surface manager (surface manager), a media library (Media Library), a three-dimensional graphics processing library (for example, an OpenGL ES), and a 2D graphics engine (for example, an SGL).

The surface manager is used to manage a display subsystem and provide fusion of 2D and 3D layers for a plurality of applications.

The media library supports playback and recording in a plurality of commonly used audio and video formats, still image files, and the like. The media library may support a variety of audio and video encoding formats, such as MPEG4, H.264, MP3, AAC, AMR, JPG, PNG, and the like.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

A working procedure of software and hardware of the electronic device 100 is described below as an example with reference to an image capture/shooting scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. In an example in which the touch operation is a click operation, and a control corresponding to the click operation is a control of a camera application icon, the camera application invokes an interface of the application framework layer to start the camera application, then starts the camera driver by invoking the kernel layer, and captures a still image or a video by using the camera 193.

Based on the electronic devices provided in the embodiments shown in FIG. 1 and FIG. 2, the following briefly describes an application scenario in the embodiments of this application. Herein, an example in which the electronic device is a mobile phone is used.

Figure 3:
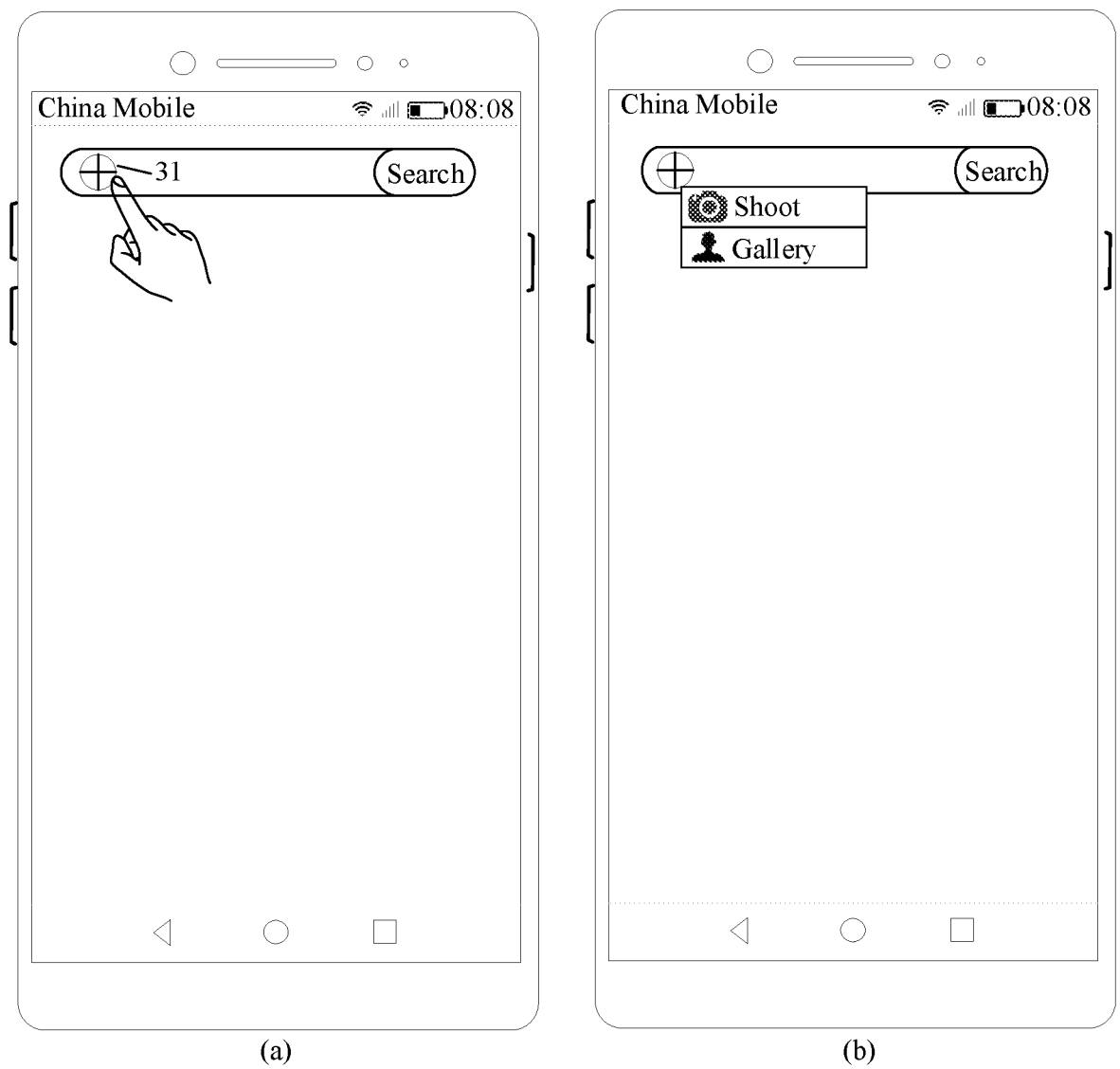
FIG. 3 is a diagram of interface display of a browser running on a mobile phone according to an embodiment of this application.

The mobile phone obtains a poster. In an example, the poster may be obtained by triggering the mobile phone to take a photo by the user, or may be an image in a gallery of the mobile phone. For example, it is assumed that a browser having a visual search function is installed in the mobile phone. When the user needs to perform visual search based on a poster, the user may click the browser in the mobile phone, and the mobile phone starts the browser in response to the click operation performed by the user on the browser. In an example, as shown in (a) in FIG. 3, the browser provides an add option 31, and the user may trigger the add option 31. As shown in (b) in FIG. 3, the mobile phone displays a "shooting" option and an "album" option in response to a trigger operation performed by the user on the add option 31. In an embodiment, when a user needs to shoot a poster by using a mobile phone, a "shooting" option in (b) in FIG. 3 may be triggered. After detecting a trigger operation performed by the user on the "shooting" option, the mobile phone starts a camera. In this way, the poster can be obtained through shooting by using the camera. In another embodiment, when a user needs to use a poster in a gallery, the user may click the "album" option in (b) in FIG. 3. After detecting a trigger operation performed by the user on the "album" option, the mobile phone opens the gallery, and the user selects the poster from the gallery. In this way, the mobile phone can obtain the poster based on the user's selection.

In an example, after obtaining the poster, the mobile phone may display the poster on the display interface. For example, a display effect of the poster is shown in FIG. 4(*a*). In an embodiment, the display interface may further provide a "search" option 32. The user may click the "search" option 32. After detecting a trigger operation performed by the user on the "search" option 32, the mobile phone performs visual search based on the poster, to obtain a search result of the search object in the poster. The search object is an object that is in the poster and that the user may be interested in, and the search object is determined by the mobile phone. For a specific determining process, refer to the following embodiments. In an embodiment, features of the search object in the poster include at least one of the following (1) to (3): (1) a contour is clear; (2) integrity is relatively high; and (3) a position is close to a center area of the poster, that is, the position is relatively centered. There may be one or more search objects in the poster. For example, the search objects in the poster shown in FIG. 4(*a*) may include a face B, or may include a face B and a mobile phone A.

It should be noted that only an example in which the "search" option 32 is provided on the display interface for the user to trigger the mobile phone to perform visual search is used herein. In another embodiment, the user may alternatively trigger, in another manner, the mobile phone to perform visual search. For example, after the mobile phone displays a poster, the user may further "shake" the mobile phone. Correspondingly, after detecting the "shake" operation of the user, the mobile phone performs visual search based on an obtained poster.

After obtaining a search result, the mobile phone feeds back the search result to the user. In an example in this application, because the search result of the search object may include a relatively large quantity of content, to enable the user to quickly and intuitively learn the search result while improving brevity of a display effect, the mobile phone may feed back the search result to the user in an inquiry scene manner. For example, the inquiry scene may include inquiry information related to a search object in a poster. For example, assuming that the poster is shown in FIG. 4(*a*), and the mobile phone determines that the search objects in the poster include a mobile phone A and a face B, the inquiry scene may include inquiry information related to the mobile phone A and the face B. As shown in FIG. 4(*b*), the inquiry information fed back by the mobile phone to the user includes "Do you want to know about star Xing?" and "Do you want to buy this phone A?" In an embodiment, when there are a plurality of search objects, the mobile phone displays the inquiry information of the plurality of search objects in descending order of priorities of the plurality of search objects. As shown in FIG. 4(*b*), because a priority of a face B is higher than a priority of a mobile phone A, the inquiry information of the face B is displayed before the inquiry information of the mobile phone A.

In an example, the user may click any one of pieces of the displayed inquiry information, so that the mobile phone displays other content in a search result related to the inquiry information clicked by the user. For example, when the user needs to know more about star Xing in the poster, the user may click the inquiry information "Do you want to know about star Xing?" After detecting a trigger operation on the inquiry information "Do you want to know about star Xing?" the mobile phone may obtain and display other content in the search result of star Xing, for example, display content such as an introduction to and works published by star Xing. The display result is shown in FIG. 4(*c*). For another example, when a user needs to buy a mobile phone A in a poster, the user may click the inquiry information "Do you want to buy this phone A?" In an embodiment, after detecting a trigger operation on the inquiry information "Do you want to buy this phone A", the mobile phone may obtain and display other content in a search result of the mobile phone A, for example, display a plurality of images of the mobile phone A. The display result is shown in FIG. 4(*d*). In another embodiment, after the mobile phone detects a click operation on the inquiry information "Do you want to buy this phone A?" if the mobile phone can obtain purchase address information of the mobile phone A, for example, the search result includes the purchase address information of the mobile phone A, the mobile phone may further display the purchase address information to the user. When a trigger operation performed by the user on the purchase address information is detected, the purchase page is jumped to, so that the user can buy the mobile phone A on the purchase page, and when the user needs to buy the mobile phone A, the user does not need to manually enter retrieval information of the mobile phone A for search again, thereby improving user experience.

It should be noted that, in the foregoing embodiment, an example in which the entire inquiry information can be triggered is merely used for description. In another embodiment, some words in the inquiry information may be triggered, for example, "star Xing" in the inquiry information "Do you want to know about star Xing?" may be triggered. When the user needs to know more about star Xing, the user may click the words "star Xing" to trigger the mobile phone to display other content in a search result of star Xing. For another example, "mobile phone A" and/or "buy" in the inquiry information "Do you want to buy this phone A?" may be triggered. When the user needs to know the mobile phone A in the poster, the user may click "mobile phone A" or "buy" to trigger the mobile phone to display other content in a search result of the mobile phone A in the poster.

Figure 4A:
FIG. 4(a) to FIG. 4(d) are a schematic diagram of an intent search process according to an embodiment of this application.
Figure 4B:
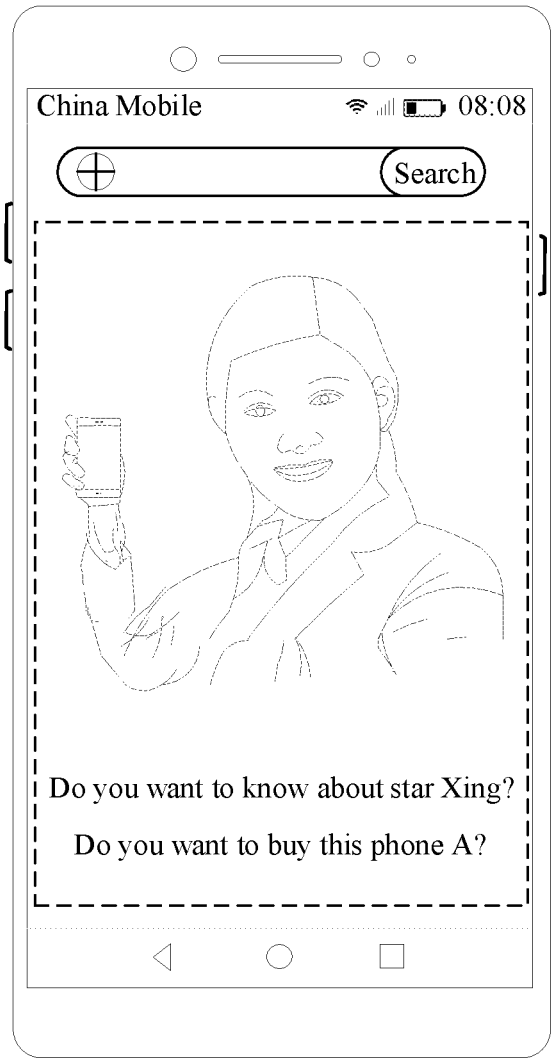
Figure 4C:
Figure 4D:
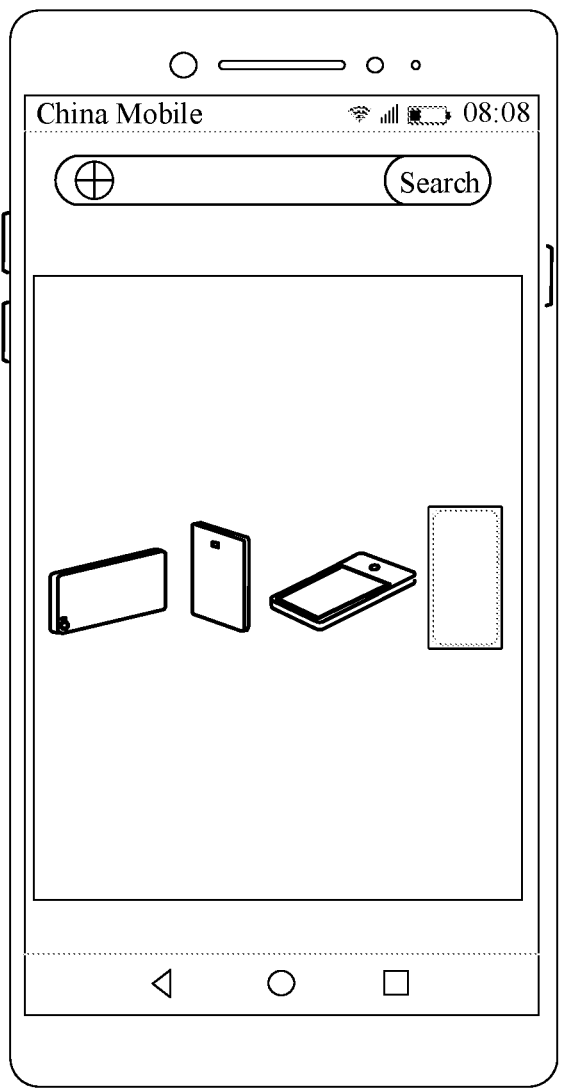
Figure 5:
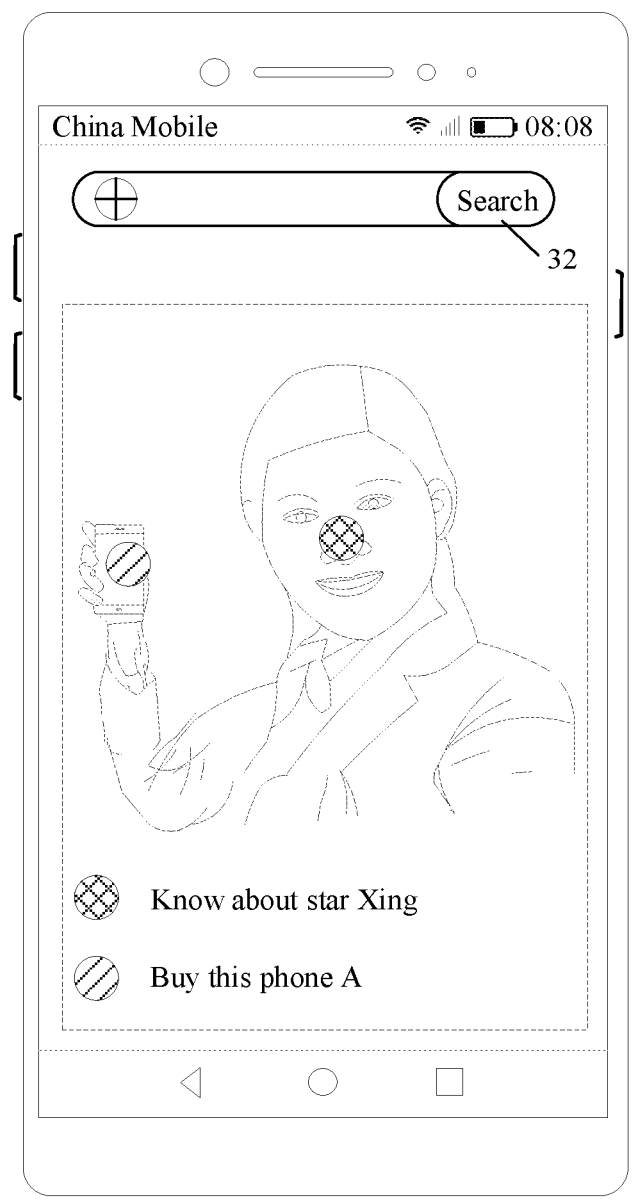
FIG. 5 is a schematic diagram of a feedback effect of a search result according to an embodiment of this application.

In another example in this application, a feedback form of the search result may also be shown in FIG. 5. That is, a triggerable item may be identified in an area in which each of one or more search objects is located in the poster, and a triggerable item corresponding to each search object may be identified in another area other than the poster on the display interface. In an example, when there are a plurality of search objects, triggerable items of the plurality of search objects may be identified in descending order of priorities of the plurality of search objects. When the user needs to know more about the search object, the user may click a triggerable item corresponding to a search object. After detecting a trigger operation performed by the user on the triggerable item, the mobile phone may display other content in a search result of the search object. For example, a display effect is shown in FIG. 4(c) or FIG. 4(d).

In an example, triggerable items corresponding to different search objects may be identified by using different colors and/or different shapes. For example, a triggerable item corresponding to a face B may be identified by using a blue dot, and a triggerable item corresponding to a mobile phone A may be identified by using a red dot. For another example, the triggerable item corresponding to the face B may be identified by using a dot, and the triggerable item corresponding to the mobile phone A may be identified by using a square.

It should be noted that the search result is fed back to the user by using the triggerable item, so that simplicity of interface display can be improved.

In an embodiment, corresponding inquiry information may be further displayed in an area near a triggerable item identified in areas on the display interface other than the poster. For example, the inquiry information "Know about star Xing" may be displayed behind a triggerable item corresponding to star Xing, and the inquiry information "Buy this phone A" may be displayed behind a triggerable item corresponding to the mobile phone A in the poster. In this way, the user can intuitively perceive the search result corresponding to the triggerable item, thereby improving user experience.

It should be noted that FIG. 5 is merely an example in which triggerable items may be identified in both the area in which each search object is located and another area in the poster. In another embodiment, a triggerable item may be identified only in an area in which each search object is located in the poster, or a triggerable item may be identified only in another area. This is not limited in this embodiment of this application.

Figure 6:
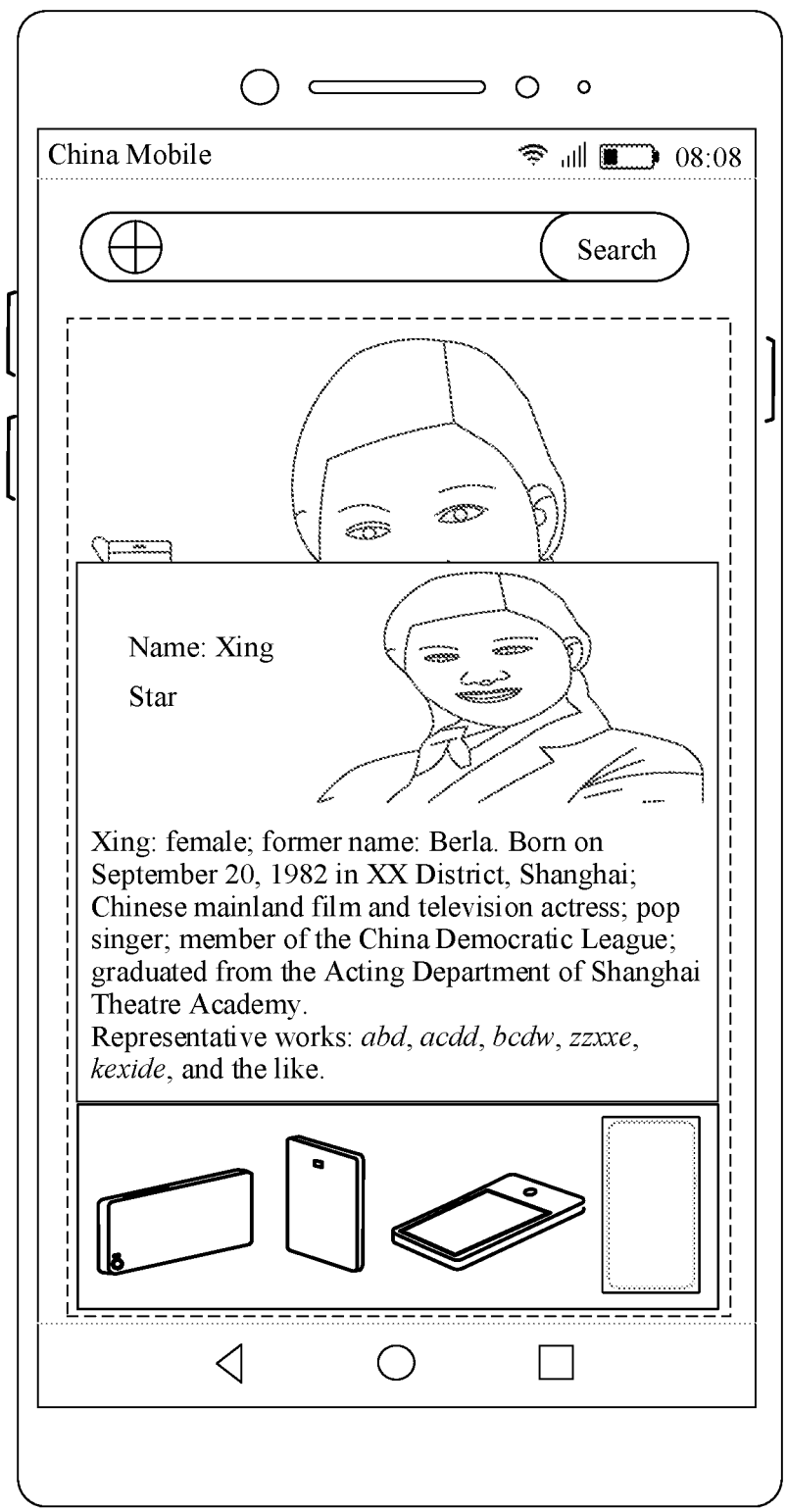
FIG. 6 is a schematic diagram of a feedback effect of another search result according to an embodiment of this application.

In still another example in this application, the mobile phone may further display search results of search objects in different rows. When there are a plurality of search objects, the mobile phone may list and display search results of different search objects in different rows in descending order of priorities of the plurality of search objects, that is, separately display search results of one or more search objects in a poster in different rows. For example, refer to FIG. 6. The mobile phone displays a search result of a face B in the first row, and displays a search result of the mobile phone A in the second row. In an embodiment, because content that can be displayed in each row is limited, one row may not be able to display all search results of the search objects. In this case, the mobile phone may further identify triggerable items of the search objects. For example, a corresponding triggerable item is identified in an area in which a face B is located, and a corresponding triggerable item is identified in an area in which the mobile phone A is located in the poster. For another example, a triggerable item is displayed in a row corresponding to the search object. In this way, when the user needs to learn more other content in the search result related to a search object, the user may click the triggerable item corresponding to the search object, so that the mobile phone displays the other content.

It should be noted that the foregoing several feedback forms of the search result are merely examples. In another embodiment, the mobile phone may further feed back the search result of the search object to the user in another manner. This is not limited in this embodiment of this application.

Figure 7:
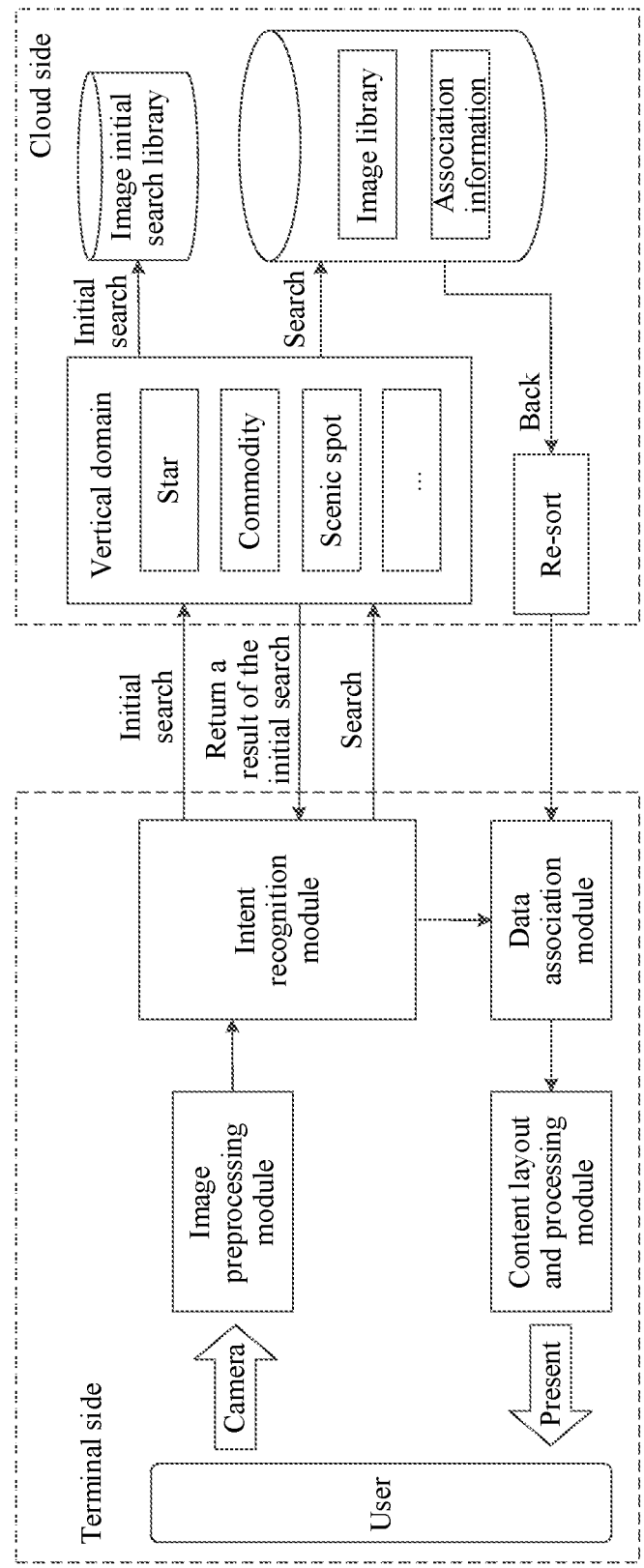
FIG. 7 is a diagram of an architecture of a search result feedback system according to an embodiment of this application.

After the application scenario of the embodiments of this application is described, the following describes a system architecture used in the embodiments of this application. Refer to FIG. 7. FIG. 7 is a schematic diagram of a system architecture according to an example embodiment. In an example in this application, the system architecture includes a terminal side and a cloud side. In an embodiment, an execution body on the terminal side is an electronic device, an execution body on the cloud side is a server, and a communication connection is established between the electronic device and the server.

For example, as shown in FIG. 7, the electronic device includes an intent recognition module, a data association module, and a content layout and processing module. During implementation, the electronic device obtains a first image. In an example, the first image may be obtained through shooting by using a camera, or may be an image uploaded from an album. The intent recognition module is configured to determine a search object in the first image by performing an operation such as image detection processing, and perform intent search on the search object in the first image by using a server, so that the server returns a search result. In addition, when the first image includes a plurality of search objects, the intent recognition module is further configured to determine priorities of the plurality of search objects. The data association module is configured to obtain and display the search result returned by the server. In an embodiment, when there are a plurality of search objects, the data association module is further configured to obtain priorities of the plurality of search objects determined by the intent recognition module, and sort the obtained search results based on the priorities of the plurality of search objects, which may also be understood as sorting the plurality of search objects herein. The content layout and processing module is configured to lay out and feed back the plurality of search results that are sorted.

Optionally, the electronic device may further include an image preprocessing module. The image preprocessing module is configured to preprocess an image shot or uploaded by the electronic device, for example, perform preprocessing such as size adjustment and denoising to obtain the first image. In this way, the shot or uploaded image is preprocessed, so that the obtained first image can better meet a processing requirement of the intent recognition module. For example, size adjustment can resolve a problem of image size inconsistency caused by different camera specifications. For another example, denoising processing can improve accuracy of image detection processing of the intent recognition module, thereby improving accuracy of visual search.

The server is configured to determine and return a search result. Databases corresponding to different vertical domains are disposed in the server, and one vertical domain corresponds to one object category. For example, the different vertical domains may include but are not limited to a star vertical domain, a commodity vertical domain, and a scenic spot vertical domain. In an embodiment, the database corresponding to each vertical domain includes but is not limited to an image library, semantic information, and work information. The image library includes at least one image of the search object. For example, the at least one image may be images of the search object that are shot at different angles. The semantic information is language description information of the search object, for example, may include an introduction to the search object. The work information includes work information such as an article or a video published by a person. At least one image, semantic information, and work information of each search object included in the database are associated with each other. For example, the search result returned by the server to the electronic device usually includes at least one image of the search object in the image library, and semantic information and work information that are associated with the at least one image.

In a possible implementation, a search result of a search object may include a plurality of pieces of data. In this case, before feeding back the search result to the electronic device, the server may further re-sort a plurality of pieces of data in the search result of the search object, to determine display orders of the plurality of pieces of data in the search result of the search object, and feed back a re-sorted search result to the electronic device. In an example, the server may sort the plurality of pieces of data in the search result of the search object according to a preset policy. The preset policy may be preset according to an actual requirement. For example, if the search result of the search object includes a plurality of images, the preset policy may be sorting based on a shooting angle. For example, a frontal image comes before an image at another angle.

In a possible implementation of this application, the intent recognition module may further perform initial search in a process of performing intent search by using the server, that is, perform an initial search operation. During initial search, the server determines a similarity between an object in the first image and an image in the image library, to determine whether a search result that matches an object in the image library, so as to screen the object in the first image through initial search, and further determine the search object in the first image based on the screening result. For specific implementation, refer to the following embodiments. In an embodiment, the server determines the similarity based on the image initial search library in the database. The image initial search library is a sub-library of a corresponding image library. In an example, a part of images may be extracted in advance from an image library corresponding to each vertical domain according to a preset policy, to obtain an image initial search library corresponding to each vertical domain. For example, for an image library corresponding to any vertical domain, one image of each object is extracted from the image library, to obtain an image initial search library corresponding to any vertical domain. In this way, when the similarity is determined, it is not necessary to perform matching on an object and all images in the image library, thereby reducing a computation workload of the server.

It should be noted that, in this embodiment of this application, the electronic device interacts with the server, that is, the electronic device obtains a search result and performs initial search by using the server. In this way, it is not necessary to set databases corresponding to different vertical domains in the electronic device, thereby reducing a running load of the electronic device and improving a running speed of the electronic device.

Certainly, it should be noted that the foregoing description is based on an example in which the method provided in this embodiment of this application is implemented through interaction between the terminal side and the cloud side. In another embodiment, the method may be alternatively independently implemented by the terminal side, that is, may be independently implemented by the electronic device. For example, databases corresponding to different vertical domains are disposed in the electronic device. In this way, when determining a search result and performing initial search, the electronic device may perform the search based on a database set by the electronic device, so that visual search can be implemented without relying on the server. In still another embodiment, the method may also be independently implemented by the server.

After the application scenario and the system architecture in the embodiments of this application are described, the following describes specific implementation of the search intent determining method provided in the embodiments of this application. The method may be applied to the system architecture shown in FIG. 7. The embodiments of this application may be executed by an electronic device, or may be executed by a server. If the execution body is a server, a related display process (for example, the display process in step 905 in the embodiment shown in FIG. 9) may be omitted, or the display process may also be executed by another device equipped with a display apparatus.

Figure 8:
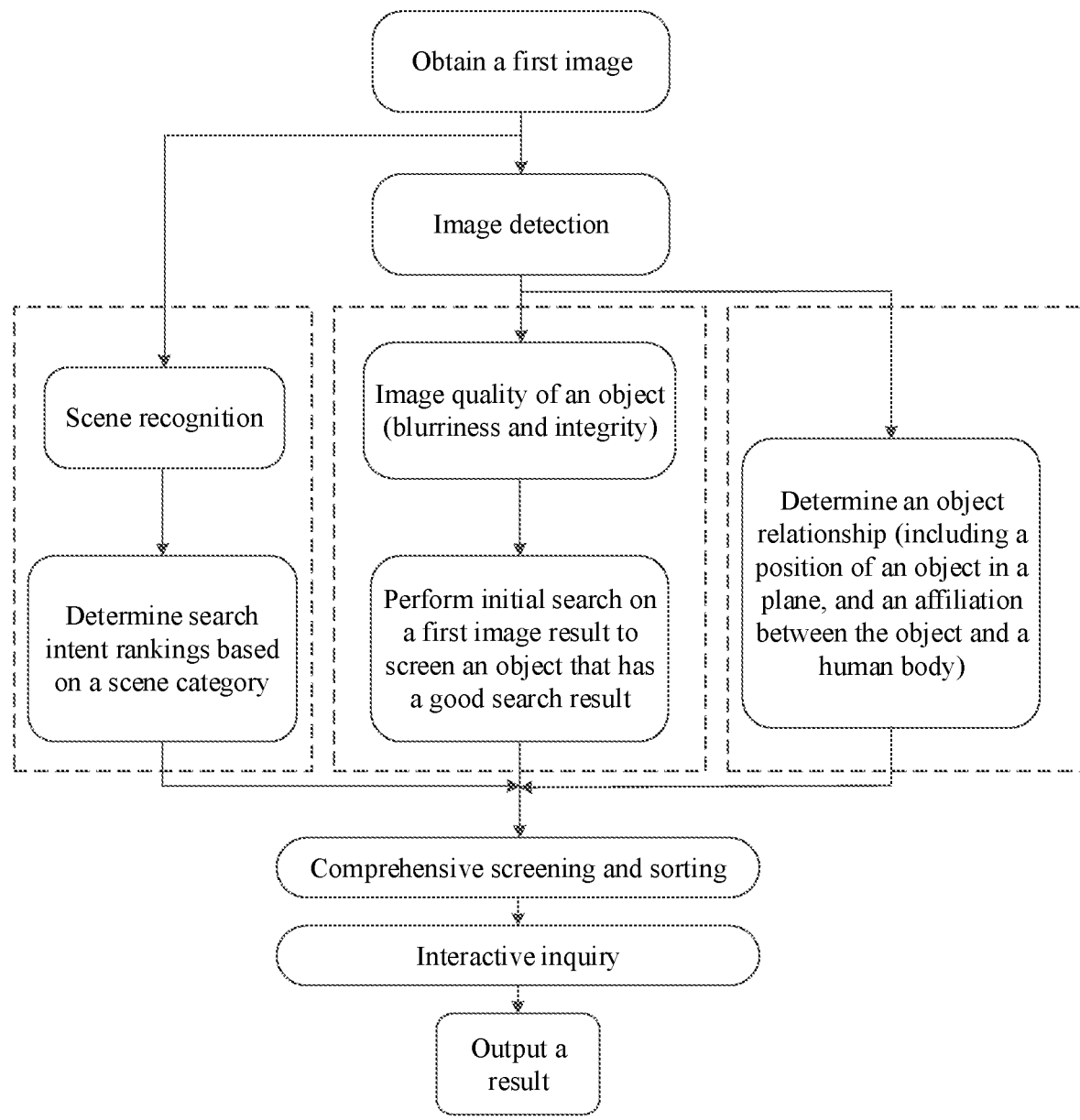
FIG. 8 is a schematic diagram of an implementation framework for feeding back a search result according to an embodiment of this application.

The following uses an example in which an execution body is an electronic device for description. In an example in this application, the intent recognition module in the electronic device includes three branches, and each branch corresponds to one processing unit. That is, the intent recognition module includes three processing units: a first processing unit, a second processing unit, and a third processing unit. Refer to FIG. 8. The first processing unit is configured to perform an operation of a branch corresponding to the left dashed box, the second processing unit is configured to perform an operation of a branch corresponding to the middle dashed box, and the third processing unit is configured to perform an operation of a branch corresponding to the right dashed box. In an embodiment, a related process of determining arrangement orders of objects in the method may be independently implemented by any one of the three processing units. In another embodiment, a related process of determining the arrangement order of the objects in the method may be implemented by a combination of any two of the three processing units. In still another embodiment, a related process of determining the arrangement order of the objects in the method may be further implemented by a combination of the three processing units. For ease of understanding, the following separately describes implementations of the three processing units by using the following several embodiments.

Figure 9:
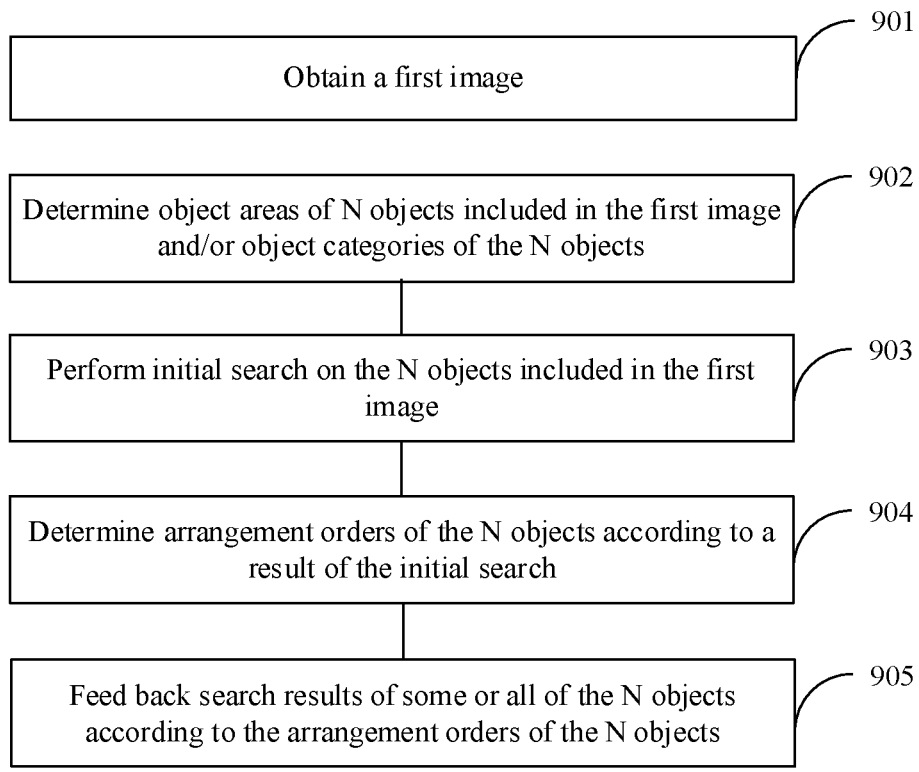
FIG. 9 is a schematic flowchart of a search result feedback method according to an embodiment of this application.

FIG. 9 is a flowchart of a search result feedback method according to an example embodiment. Herein, an example in which a related process of determining arrangement orders of objects used in the method is independently implemented by a second processing unit is used for description. The method may specifically include a part or all of the following content.

Step 901: Obtain a first image.

In an example, the first image is obtained by an electronic device through shooting by using a camera, or the first image is an image in a gallery. In another example, the first image may alternatively be obtained by performing preprocessing on a shot or uploaded image. For specific implementation of obtaining the first image, refer to the foregoing description. Details are not described herein again.

The first image includes M objects, where M is an integer greater than or equal to 2.

Step 902: Determine object areas of the N objects included in the first image and/or object categories of the N objects, where N is a positive integer less than or equal to M.

The object area of each object is an object area of each object in the first image.

Refer to FIG. 8. The electronic device performs image detection processing on the first image by using the intent recognition module, to determine an object area of each of the N objects included in the first image and/or an object category of each object. In an example, the intent recognition module includes a target detection model. In this way, image detection processing is performed on the first image by using the target detection model, to obtain the object area of each object and/or the object category of each object. The target detection model may be a pre-trained detection model, and can be used to detect an object area and/or an object category that are/is of an object in any image and that are/is in the any image.

Figure 10:
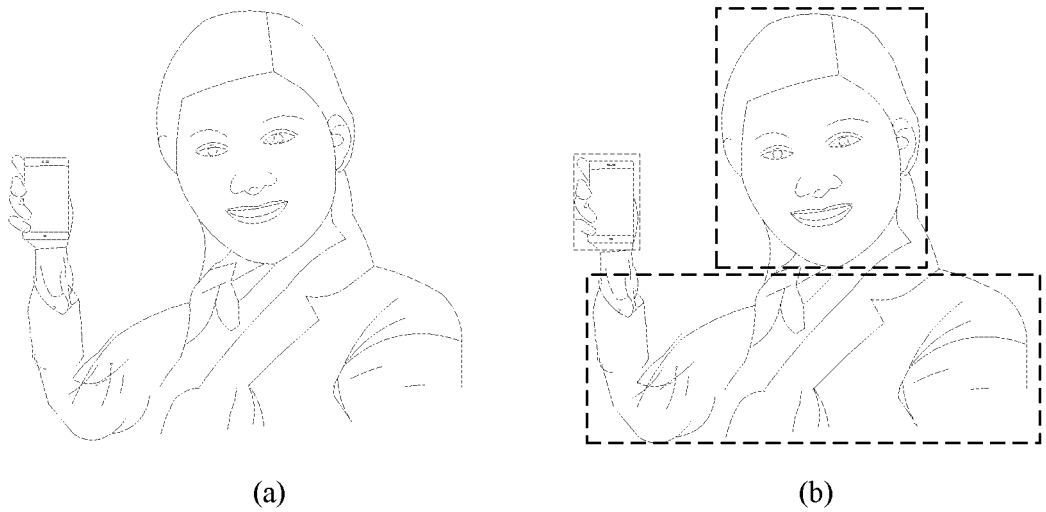
FIG. 10 is a schematic diagram of an image detection process according to an embodiment of this application.

For example, it is assumed that the first image is shown in (a) in FIG. 10. After the first image is input into the target detection model, position information and an object category of each of the N objects included in the first image are determined by using the target detection model, where the position information is used to indicate an object area of the object in the first image. In an example, the electronic device marks, by using an object frame, each object in the first image based on the position information determined by the target detection model, to obtain a second image. For example, the second image is shown in (b) in FIG. 10. That is, after image detection processing is performed, it is determined that N objects included in the first image are a face, a mobile phone, and clothing, and object categories of the N objects are respectively a face, a commodity, and clothing.

In an embodiment, the target detection model may be obtained after the to-be-trained model is pre-trained based on an object detection sample set. In an example, each object detection sample in the object detection sample set is an object image marked with an object category label. For example, the object detection sample set may include a face image sample, a clothing image sample, a commodity image sample, a landmark image sample, an animal image sample, and a plant image sample.

In an example in this application, the to-be-trained model may be a model combining the mobilenetV3 and a single shot multibox detector (Single Shot MultiBox Detector, SSD), that is, a model formed by using the mobilenetV3 as a network basis and using a structure of an SSD. A network structure of the mobilenetV3 may be described by using Table 1.

TABLE 1

| Input | Operator | exp size | # Output | SE | NL | s |
|---|---|---|---|---|---|---|
| 224²*3 | conv2d | — | 16 | — | HS | 2 |
| 112²*16 | bneck,3*3 | 16 | 16 | — | RE | 1 |
| 112²*16 | bneck,3*3 | 64 | 24 | — | RE | 2 |
| 56²*24 | bneck,3*3 | 72 | 24 | — | RE | 1 |
| 56²*24 | bneck,5*5 | 72 | 40 | ✓ | RE | 2 |
| 28²*40 | bneck,5*5 | 120 | 40 | ✓ | RE | 1 |
| 28²*40 | bneck,5*5 | 120 | 40 | ✓ | RE | 1 |
| 28²*40 | bneck,3*3 | 240 | 80 | — | HS | 2 |
| 14²*80 | bneck,3*3 | 200 | 80 | — | HS | 1 |
| 14²*80 | bneck,3*3 | 184 | 80 | — | HS | 1 |
| 14²*80 | bneck,3*3 | 184 | 80 | — | HS | 1 |
| 14²*80 | bneck,3*3 | 480 | 112 | ✓ | HS | 1 |
| 14²*112 | bneck,3*3 | 672 | 112 | ✓ | HS | 1 |
| 14²*112 | bneck,5*5 | 672 | 160 | ✓ | HS | 1 |
| 14²*112 | bneck,5*5 | 672 | 160 | ✓ | HS | 2 |
| 7²*160 | bneck,5*5 | 960 | 160 | ✓ | HS | 1 |
| 7²*160 | conv2d,1*1 | — | 960 | — | HS | 1 |
| 7²*960 | Pool,7*7 | — | — | — | HS | — |
| 1²*960 | conv2d 1*1,NBN | — | 1280 | — | HS | 1 |
| 1²*1280 | conv2d 1*1,NBN | — | k | — | — | — |

Figure 11:
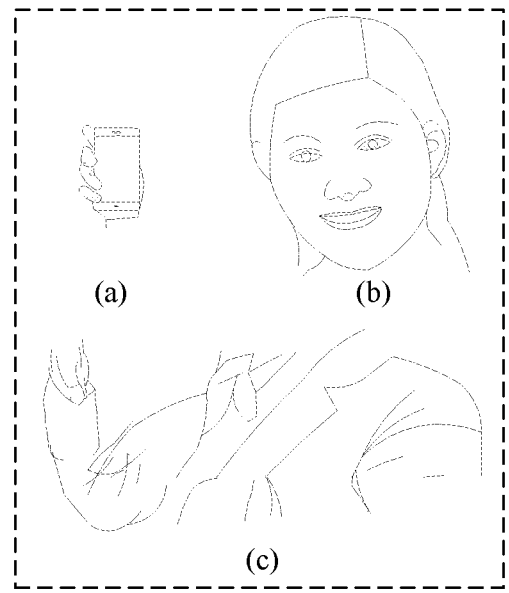
FIG. 11 is a schematic diagram of an image area of an object obtained after image processing according to an embodiment of this application.

In an example in this application, after determining the object areas of the N objects included in the first image and/or the object categories of the N objects, the electronic device may obtain, from the first image, the object area of each of the N objects through cutting. For example, after an object area of each object in the first image shown in (b) in FIG. 10 is obtained through cutting, the obtained object area of each object is shown in FIG. 11. The object shown in (a) in FIG. 11 is a "mobile phone", the object shown in (b) in FIG. 11 is a "face", and the object shown in (c) in FIG. 11 is "clothing".

In a possible implementation, the N objects included in the first image are the M objects in the first image, that is, N is equal to M. In another possible implementation, the N objects included in the first image are determined through quality screening. That is, before the object areas of the N objects and/or the object categories of the N objects are determined, quality screening may be further performed on the M objects in the first image, to determine the N objects.

In an example, quality scores of the N objects in the first image are higher than or equal to a quality score threshold, and a quality score of any one of the N objects is determined based on blurriness and/or integrity of the any object. The quality score threshold may be set according to an actual requirement. In an embodiment, the quality screening process may include the following substeps (1) and (2).

(1) Determine a Quality Score of Each of the M Items Included in the First Image.

In an embodiment, image quality of one or more objects in the first image may be relatively poor due to a reason such as a shooting angle. For example, the first image may include a passerby or another object, and the passerby or the another object is relatively blurry in the first image, or only a small part of the passerby appears. For example, the first image may include only a part of a body of a passerby. In most cases, a user is not concerned about these objects. Therefore, the electronic device may determine, by using the second processing unit, the quality score of each of the M objects included in the first image, to perform filtering processing on some of the M objects included in the first image, so as to filter out each object with relatively poor image quality.

In an example, image quality of any object may be measured by using blurriness and/or integrity of the any object. That is, the second processing unit determines the blurriness and/or integrity of each of the M objects included in the first image, to determine a quality score of each object. The blurriness may be described based on definition of a contour of the object. That is, if the contour of the object is clear, it may be determined that the blurriness of the object is relatively low; on the contrary, if the contour of the object is unclear, it may be determined that the blurriness of the object is relatively high. Integrity refers to a proportion of an unblocked part to a total part of an object.

In an embodiment, the second processing unit may determine the blurriness of the object by using a Laplace variance algorithm. For example, a Laplacian mask may be used to perform a convolution operation on a pixel value in an area in which the object in the first image is located, a variance is calculated, and then score mapping is performed on the variance of the object, to obtain the blurriness of the object. For example, this may be implemented by using the following code:

```
frame=cv2.imread(img)
resImg=cv2.resize(frame, (800, 900),
    interpolation=cv2.INTER_CUBIC)
img2gray=cv2.cvtColor(resImg,
    cv2.COLOR_BGR2GRAY)
res=cv2.Laplacian(img2gray, cv2.CV_64F)
score=res.var( )
```

In the foregoing code, an object area of any one of the M objects is read, a size of the area of the any object is adjusted to a fixed size, grayscale processing is performed on a pixel value in the area of the any object after size adjustment, that is, the object area is converted into a single-channel grayscale image; and a Laplacian standard deviation is calculated based on the single-channel grayscale image, so as to obtain blurriness of the any object.

In an embodiment, the integrity of any one of the M objects may be determined by using a pre-trained integrity prediction model. For example, for any one of the M objects included in the first image, an object area of the any object may be input into the integrity prediction model, and prediction processing is performed by using the integrity prediction model, to output the integrity of the any object.

In an embodiment, the integrity prediction model may be obtained by training a to-be-trained model based on an integrity training sample set. The integrity training sample set may include a plurality of integrity training samples. Each integrity training sample includes an object sample image and integrity of the object sample image. The to-be-trained model may be a mobilenetV3 model that is not trained. That is, the electronic device may obtain a large quantity of object samples with different integrity in advance, and then input the object samples into the untrained mobilenetV3 model for model training, to obtain the integrity prediction model.

It should be noted that the integrity prediction model may be an independent model, or may be a model integrated with the foregoing target detection model. This is not limited in this embodiment of this application.

In addition, it should be noted that the foregoing description is provided only by using an example in which the integrity of the object is determined by using the integrity prediction model. In another embodiment, the second processing unit may alternatively determine the integrity of the object in another manner. For example, an area of a blocked area of the object and an area of the area in which an object frame of the object is located may be determined, and then the integrity of the object is determined based on the two determined areas. This is not limited in this embodiment of this application.

Figure 12:
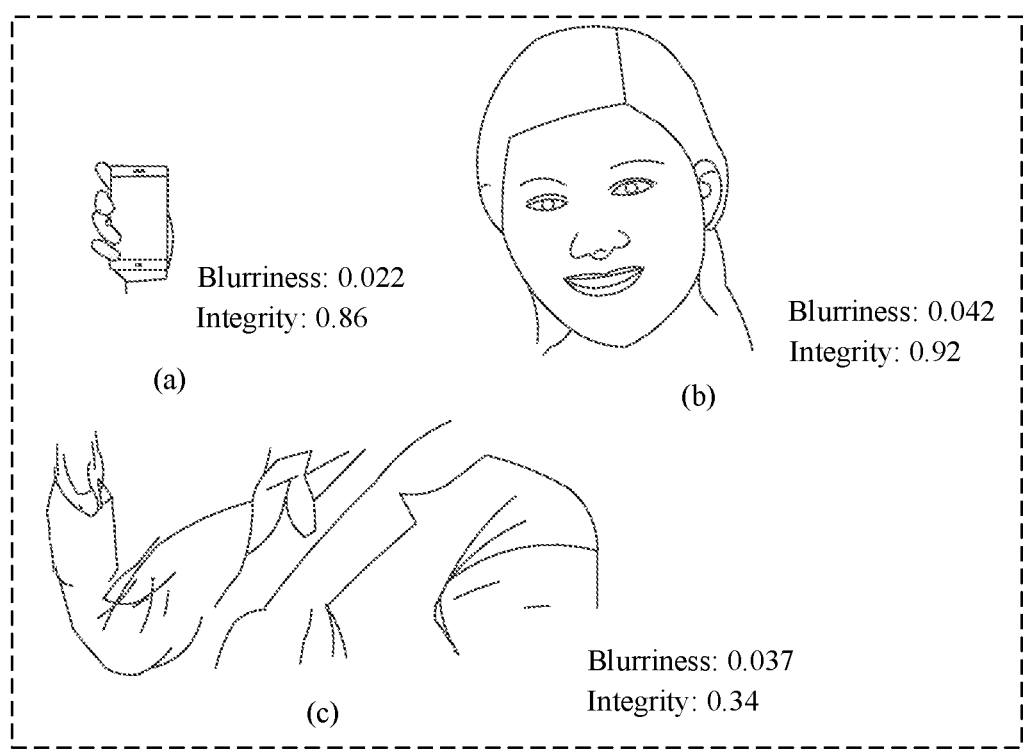
FIG. 12 is a schematic diagram of blurriness and integrity of an object according to an embodiment of this application.

For example, the second processing unit determines the blurriness and integrity of each of the M objects included in the first image, as shown in FIG. 12. As shown in (a) in FIG. 12, the blurriness and integrity of the mobile phone are 0.022 and 0.86, respectively. As shown in (b) in FIG. 12, the blurriness and integrity of a face are 0.042 and 0.92, respectively. As shown in (c) in FIG. 12, the blurriness and integrity of clothing are 0.037 and 0.34, respectively.

After determining the blurriness and/or integrity of each object in the first image, the second processing unit determines the quality score of each object based on the blurriness and/or integrity of each object in the first image. The quality score is used to indicate image quality of the object. The quality score is positively correlated with the image quality. That is, a larger quality score indicates better image quality of the object.

In an example, that a quality score of any object is determined based on the blurriness and the integrity of the any object is used as an example. The second processing unit may set a blurriness weight and an integrity weight, and then determine the quality score of the any object based on the blurriness and integrity of the any object by using the following formula (1):

$$S_i = aF_i + bI_i \quad (1)$$

$S_i$ represents the quality score of the object i; a represents the blurriness weight, where a is a negative value; $F_i$ represents the blurriness of the object i; b represents the integrity weight; and $I_i$ represents the integrity of the object i. The blurriness weight and the integrity weight may be set according to an actual requirement. This is not limited in this embodiment of this application.

(2) Use Objects that are Screened from the M Objects Included in the First Image Based on the Quality Scores of all the M Objects as the N Objects.

The second processing unit performs filtering processing based on a quality score. For example, for any one of the M objects included in the first image, when the quality score of the any one object is lower than a quality score threshold, the any one object is filtered out.

In another embodiment, the M objects included in the first image may be further sorted in descending order of quality scores, and then the first N objects with the highest arrangement orders are obtained as the N objects, where N is an integer greater than 1.

It should be noted that the foregoing quality screening process is merely an example. In another embodiment, quality screening may be specifically implemented in any one of the following manners: for any one of the M objects included in the first image, if the blurriness of the any object is higher than a blurriness threshold, the any object is filtered out, that is, an object whose image is relatively blurry is filtered out; or if the integrity of the any object is lower than an integrity threshold, the any object is filtered out, that is, an object whose integrity is relatively low is filtered out; or if the blurriness of the any object is higher than the blurriness threshold and the integrity of the any object is lower than the integrity threshold, the any object is filtered out, that is, an object that is blurry and non-integral is filtered out. In addition, remaining objects obtained after the filtering processing are determined as the N objects included in the first image.

The blurriness threshold may be set by the user according to an actual requirement, or may be set by the electronic device by default. This is not limited in this embodiment of this application.

The integrity threshold may be set by the user according to an actual requirement, or may be set by the electronic device by default. This is not limited in this embodiment of this application.

It should be noted that, in this embodiment of this application, some objects with relatively poor image quality are filtered out, so that the intent understanding is associated with an object attribute, and search processing is not performed on some objects that do not match the search intent, thereby improving search effectiveness and accuracy, and improving user experience.

It should be noted that if the quality scores of the M objects in the first image are all lower than the quality score threshold, the electronic device ends the intent search. That is, if the M objects included in the first image are all blurry or have relatively low integrity, the electronic device does not perform intent search, for example, may inform the user that the first image is unavailable.

Step 903: Perform initial search on the N objects included in the first image.

In an example, the second processing unit sends an initial search request to the server, where the initial search request carries the object areas of the N objects and the object categories of the N objects. After receiving the initial search request, the server parses the initial search request to obtain the object areas of the N objects and the object categories of the N objects. In this embodiment, a first object is used as an example for description. The first object is any one of the N objects. The server determines a corresponding vertical domain according to an object category of the first object, and then determines a similarity between an object area of the first object and an image in an image initial search library of the determined vertical domain. During implementation, the server extracts an object feature in the object area of the first object, obtains an object feature of each image in the image initial search library corresponding to the determined vertical domain, and determines a similarity between the extracted object feature and the obtained object feature of each image, to obtain a plurality of similarities. The server determines a maximum similarity in the plurality of similarity degrees as a confidence score of the first object. As described above, because the image initial search library is a sub-library of the image library, when the similarity is relatively large, it indicates that an image matching the first object exists in the image library, in other words, a search result matching the first object exists in the database of the server. Therefore, the confidence score is a similarity between the first object and an image in the image library, and can be used to indicate a degree of matching between a search intent of the first object and the search result. By way of example rather than limitation, the server determines a label of an image corresponding to the maximum similarity, and uses the label as an object label of the first object. The server sends the confidence score and the object label of the first object to the electronic device as a result of the initial search (or referred to as an initial search result). The object label may be used by the electronic device for subsequent selective presentation.

It should be noted that herein, an example in which the object area and the object category of the object are sent to the server, and the server extracts the object feature of the object is merely used for description. In another embodiment, the second processing unit may further extract an object feature of the object area, and send the object feature and the object category to the server. In this way, the server does not need to perform a feature extraction operation on the object area.

For another example, the electronic device has a database. In this case, the second processing unit may determine an image library corresponding to the object category of the first object, determine a similarity between an object area of the first object in the first image and each of a plurality of images included in the image library, and then use a maximum similarity in the determined plurality of similarities as the confidence score of the first object.

Step 904: Determine arrangement orders of the N objects according to a result of the initial search.

The electronic device determines the arrangement orders of the N objects according to the confidence score. An arrangement order of any one of the N objects corresponds to a priority, and a higher arrangement order indicates a higher priority.

Step 905: Feed back search results of some or all of the N objects according to the arrangement orders of the N objects.

That is, the electronic device may feed back the search results of all the N objects according to the arrangement orders of the N objects, or may select some objects from the N objects, and feed back the search results of the objects according to the arrangement orders of the N objects.

For ease of description and understanding, some or all of the N objects whose search results are to be fed back are referred to as search objects. It is not difficult to understand that there may be one or more search objects. That is, the search objects include some of the N objects. In another embodiment, the search objects include all of the N objects.

In an example, the electronic device selects, from the N objects, a preset quantity of objects with the highest arrangement orders as the search objects. The preset quantity may be set according to an actual requirement, for example, the preset quantity is 2.

In another example, the electronic device may alternatively determine the search objects based on the confidence scores of the N objects. For example, for the first object in the N objects, the electronic device compares the confidence score of the first object with the confidence score threshold. If the confidence score of the first object is lower than the confidence score threshold, it indicates that a search result matching the first object may not exist in the server. In this case, to improve user experience, that is, to provide a good search result for the user, the first object may be filtered out, that is, intent search may not be performed on the first object subsequently. On the contrary, if the confidence score of the first object is higher than the confidence score threshold, it indicates that a search result matching the first object exists in the server. In this case, the first object may be determined as the search object.

In this way, the search object is screened from the first image based on the confidence score, so that intent understanding corresponds to a search result, and accuracy of intent search can be improved.

In an example, after determining the search object, the electronic device sends a search request to the server, where the search request carries an object area and an object category of at least one search object. After receiving the search request, the server parses the search request to obtain the object area and the object category of the at least one search object. A search object is used as an example for description: The server determines a corresponding vertical domain based on an object category of the search object, and obtains a search result of the search object from a database of the determined vertical domain based on the object area. In an embodiment, the database includes an image library and association information. The server performs matching on an object area of the search object and an image in the image library, to determine at least one image of the search object and the association information. The server uses the at least one image of the search object and the associated information as the search result of the search object. Then, the server returns the search result of each of the at least one search object to the electronic device.

It should be noted that the foregoing description is based on an example in which the electronic device sends the object area and the object category of the at least one search object to the server when performing intent search. In another embodiment, after parsing the initial search request to obtain the object areas and the object categories of the N objects, the server may locally generate index information of each of the N objects, and establish a mapping relationship between each piece of index information and the object area and the object category of each object. The server sends the index information of each of the N objects to the electronic device. In this case, when the electronic device performs intent search on the search object, the electronic device does not need to send the object area and the object category of the search object to the server again, but sends the index information of the search object to the server, and the server may directly obtain the object area and the object category of the search object locally based on the index information. In this way, the electronic device does not need to upload the object area and the object category again, so that traffic can be reduced.

When there is one search object, the electronic device directly feeds back the search result of the search object to the user.

When there are a plurality of search objects, the search results of the plurality of search objects are fed back according to arrangement orders of the plurality of search objects. That is, the search result of the search object with a higher priority is preferentially displayed.

In an example, specific implementation of feeding back the search results of the plurality of search objects according to the arrangement orders of the plurality of search objects may include: obtaining an object label included in the search result of each of the plurality of search objects, generating inquiry information corresponding to each search object based on the object label of each search object, where the inquiry information is used to prompt whether information associated with the object label needs to be obtained, and displaying the inquiry information of the plurality of search objects according to the arrangement orders of the plurality of search objects, so as to feed back the search results of the plurality of search objects.

The information associated with the object label of each search object refers to information other than the object label included in the search result of each search object, for example, including semantic information, work information, and an image of the search object.

In an example, the N objects include a second object and a third object, an arrangement order of the second object comes before an arrangement order of the third object, and a display order of a search result corresponding to the second object on the display comes before a display order of a search result corresponding to the third object on the display.

Figure 13:
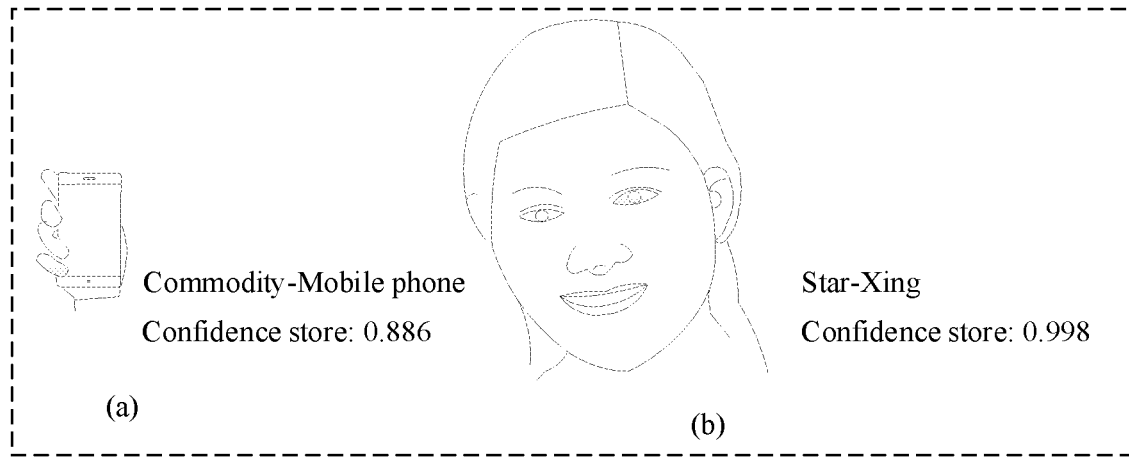
FIG. 13 is a schematic diagram of a confidence score of an object according to an embodiment of this application.

For example, it is assumed that the obtained search results include a search result of a face B in the first image and a search result of a mobile phone A. Refer to FIG. 13. As shown in (a) in FIG. 13, a confidence score of the mobile phone A is 0.886; and as shown in (b) in FIG. 13, a confidence score of the face B is 0.998. The confidence score of the face B is higher than the confidence score of the mobile phone A, that is, an arrangement order of the face B comes before an arrangement order of the mobile phone A. In this case, in a process of displaying search results, a search result of the face B is preferentially fed back. For example, the search result of the face B may be displayed before the search result of the mobile phone A. The display result is shown in FIG. 4(b).

In this embodiment of this application, initial search is performed on the N objects in the first image, to determine the confidence scores of the N objects in the first image, and then objects are screened based on the confidence scores of the N objects in the first image, to screen out each object whose intent understanding does not match the search result, thereby improving accuracy of intent search. In addition, the screened objects are sorted and displayed based on the confidence scores, so that a search result of an object that the user may be interested in is preferentially displayed, thereby improving user experience.

Figure 14:
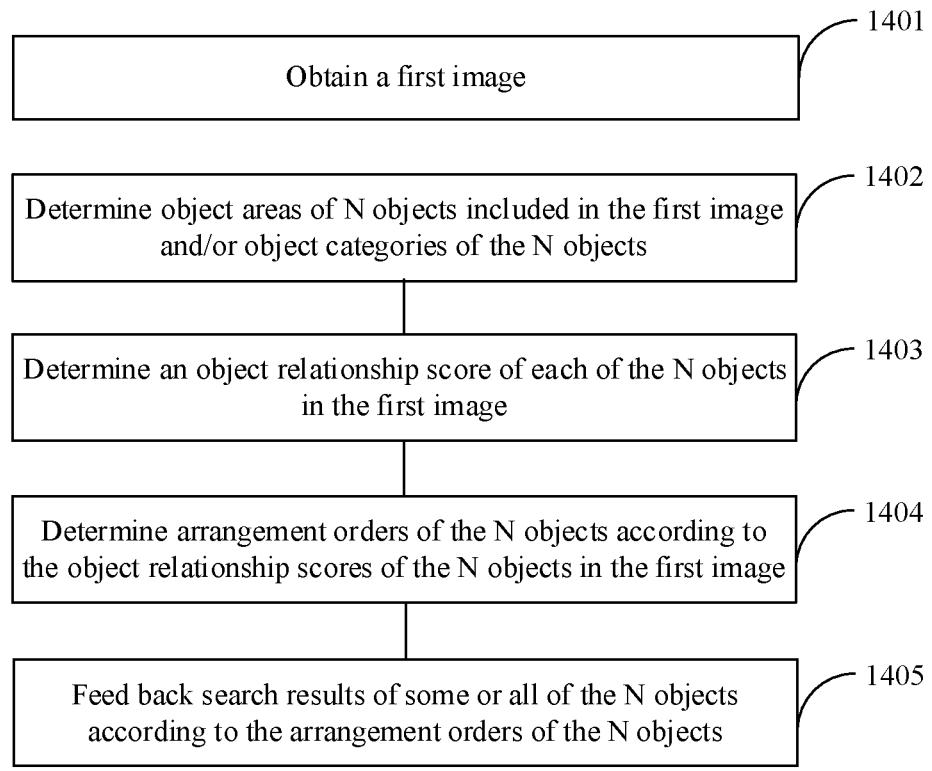
FIG. 14 is a schematic flowchart of another search result feedback method according to an embodiment of this application.

FIG. 14 is a flowchart of a search result feedback method according to an example embodiment. Herein, an example in which a related process of determining arrangement orders of objects used in the method is independently implemented by a third processing unit is used for description. The method may specifically include a part or all of the following content.

For specific implementation of step 1401 and step 1402, refer to step 901 and step 902 in the embodiment in FIG. 9.

Step 1403: Determine an object relationship score of each of the N objects in the first image.

An object relationship score of any one of the N objects is used to indicate importance of the any object in the first image.

Figure 15:
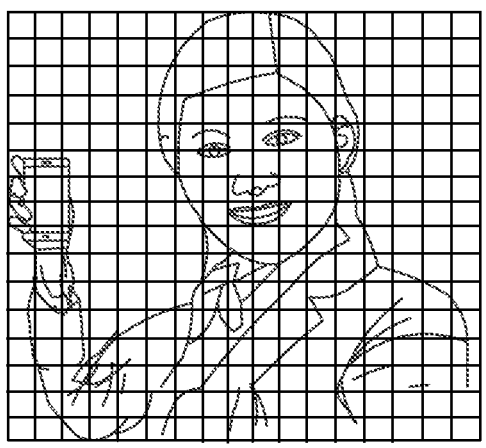
FIG. 15 is a schematic diagram of an image division effect according to an embodiment of this application.
Figure 16:
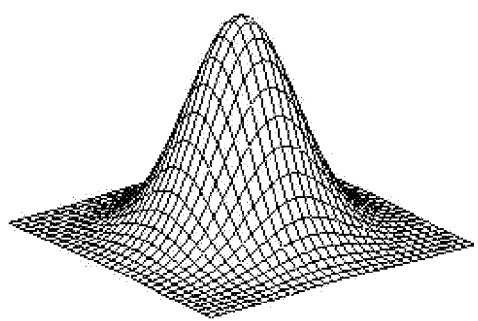
FIG. 16 is a schematic diagram of Gaussian distribution of preset scores according to an embodiment of this application.

In an example in this application, refer to FIG. 15. The first image may be divided into a plurality of areas. For example, the first image is divided into N*N areas, where N is an integer greater than 1 and may be set according to an actual requirement. Then, a preset score is set for each area starting from the center area, where the preset score of each area is used to indicate position importance of each area, and preset scores of at least two areas in the plurality of areas are different. Generally, an object closer to the center area is an object that the user may be interested in. Therefore, during setting of the preset scores, the preset scores of the center area are set to the highest, and all the preset scores spread around and gradually decrease. For example, the preset scores of all areas may be set according to Gaussian distribution, and the Gaussian distribution of the preset scores is shown in FIG. 16.

The electronic device determines a position importance value of each of the N objects. A first object is used as an example, and the first object is any one of the N objects. An average value of preset scores of areas included in an object frame of the first object is determined, and the obtained score is used as the position importance value of the first object. For example, it is assumed that the N objects in the first image include a face, a mobile phone, and clothing. It is determined, through calculation, that the position importance value of the face in the first image is 0.78, the position importance value of the mobile phone is 0.7, and the position importance value of the clothing is 0.68.

Then, an object relationship score of each object is determined based on the position importance value of each object. For example, the position importance value of each object is determined as the object relationship score of each object. For example, the position importance value of the first object is determined as the object relationship score of the first object.

In an embodiment of this application, the first image may further include a reference object. The reference object may be set according to an actual requirement. For example, the reference object may be a human body. For example, the reference object is a human body. When the first image includes a human body, an object that is relatively close to the human body is usually an object that the user may be interested in, and an object that is relatively far away from the human body is an object that the user is not interested in. Therefore, when the object relationship scores of the N objects in the first image are determined, if the first image includes a reference object, a distance between the first object and the reference object in the first image may be further obtained based on an object area of the first object in the first image and an object area of the reference object in the first image, and the distance is used as an affiliation value of the first object. For example, if the reference object is a human body, when it is determined that the distance between the mobile phone and the human body is 0.42, it is determined that the affiliation value of the mobile phone is 0.42.

For example, when the distance between the first object and the reference object is determined, the distance between the center point of the first object and the center point of the reference object may be determined. In some embodiments, when a size of the first image is adjusted, the distance between the center point of the first object and the center point of the reference object changes accordingly. Therefore, to ensure that the determined affiliation values of the first images of different sizes are the same, normalization processing may be performed on distances. For example, normalization processing may be performed by using diagonal distances of the first images.

Certainly, for the reference object, the affiliation value of the reference object may be set according to an actual requirement, for example, may be set to 1. For example, when the reference object is a human body, the affiliation value of a face is 1.

In an embodiment, when the first image includes a plurality of reference objects, a distance between the first object and each reference object in the first image is determined, to obtain the plurality of distances, and then a minimum distance in the plurality of distances is used as an affiliation value.

In an embodiment, when the first image includes a reference object (for example, a human body), the electronic device determines the object relationship score of the first object based on the position importance value and the affiliation value of the first object. For example, specific weights may be separately set for the position importance value and the affiliation value, and then the object relationship score of the first object is obtained through fusion in an equal weight manner. Both the weight of the position importance value and the weight of the affiliation value may be set according to an actual requirement. This is not limited in this embodiment of this application.

Step 1404: Determine arrangement orders of the N objects according to the object relationship scores of the N objects in the first image.

During implementation, the arrangement orders of the N objects are determined based on the object relationship scores of the N objects.

Step 1405: Feed back search results of some or all of the N objects according to the arrangement orders of the N objects.

During implementation, the search object may be determined from the N objects. In an embodiment, the search objects include some of the N objects. In another embodiment, the search objects include some of the N objects.

In an example, a preset quantity of objects with the highest arrangement orders may be selected from the N objects as the search objects according to the arrangement orders of the N objects.

For another example, the search object may be determined based on an object relationship score. When the object relationship score is relatively high, it indicates that a corresponding object is relatively important and may be an object that the user is interested in. On the contrary, when the object relationship score is relatively low, it indicates that a corresponding object is not important, that is, may not be an object that the user is interested in. Therefore, the electronic device may filter out each object whose object relationship score is lower than the score threshold, and determine an object whose object relationship score is higher than the score threshold as the search object.

The score threshold may be set by the user according to an actual requirement, or may be set by the electronic device by default. This is not limited in this embodiment of this application.

It should be noted that, in this embodiment of this application, the search object is screened from the first image based on the object relationship score of the object in the first image, so that intent search is performed only on a relatively important object in the first image, a search result of a search object that the user is interested in is provided for the user, and user experience can be improved.

Then, the intent search is performed on the search object to obtain the search result, and the search result of the search object is fed back. For specific implementation, refer to related content of step 905 in the embodiment shown in FIG. 9.

For example, it is assumed that search objects in the first image include a face B and a mobile phone A, and obtained search results include a search result of the face B and a search result of the mobile phone A. If an object relationship score of the face B is higher than an object relationship score of the mobile phone A, that is, an arrangement order of the face B comes before an arrangement order of the mobile phone A, the search result of the face B is preferentially fed back in a process of displaying the search result, for example, the search result of the face B may be displayed before the search result of the mobile phone A.

In this embodiment of this application, the position importance values of the N objects in the first image in the two-dimensional space are determined, the value of an affiliation between each object and the reference object is determined, and then the object relationship score of each object is determined based on the position importance value and the affiliation value, so that the search intent of the object is associated with an object attribute, and a search result of a search object that the user may be interested in is preferentially recommended to the user, thereby improving user experience.

Figure 17:
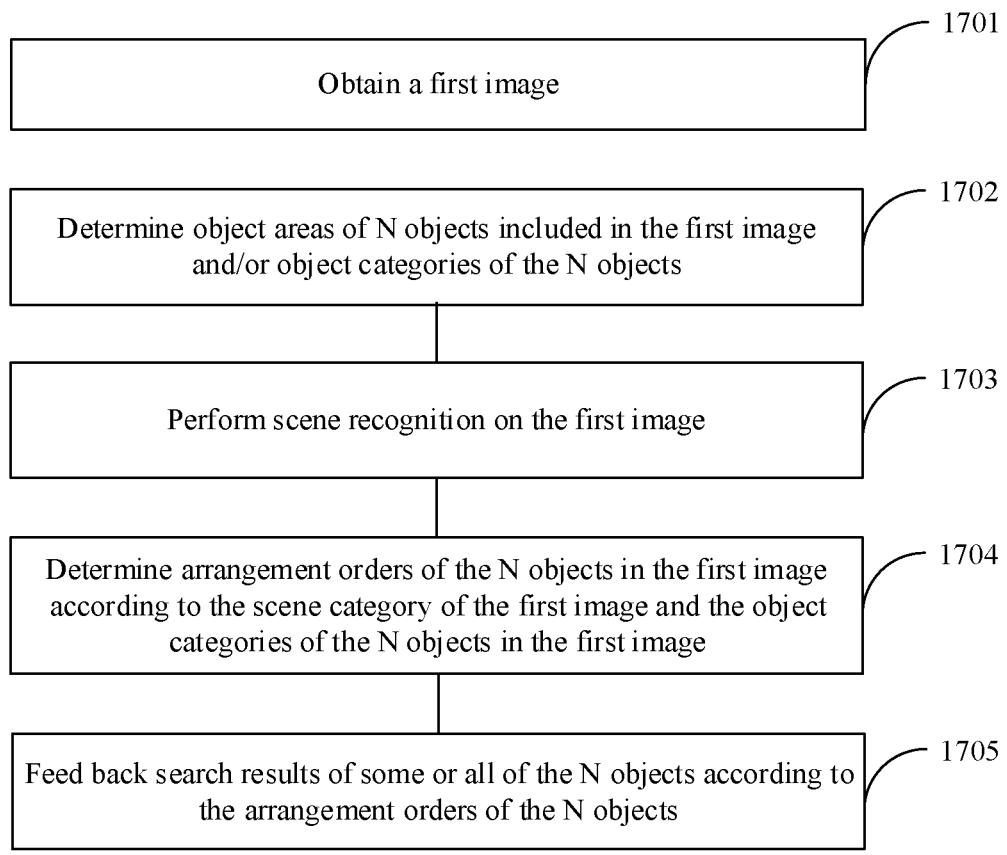
FIG. 17 is a schematic flowchart of another search result feedback method according to an embodiment of this application.

FIG. 17 is a flowchart of a search result feedback method according to an example embodiment. Herein, an example in which a related process of determining arrangement orders of objects used in the method is independently implemented by a first processing unit is used for description. The method may specifically include a part or all of the following content.

For specific implementation of step 1701 and step 1702, refer to step 901 and step 902 in the embodiment in FIG. 9.

Step 1703: Perform scene recognition on the first image.

In an example, the electronic device performs scene recognition on the first image by using the first processing unit, so as to determine the scene category corresponding to the first image. In an example in this application, the scene category may include but is not limited to a character poster, a bar, a hotel, a cafe house, a cinema, a conference room, outdoor scenery, and an outdoor landmark.

In a possible implementation of this application, the first processing unit may perform scene recognition on the first image by using a scene recognition model. The scene recognition model may be a model that is pre-trained and that can determine a corresponding scene category based on any image. During implementation, the first image may be input into the scene recognition model, scene recognition is performed on the first image by using the scene recognition model performs, and the scene category corresponding to the first image is output. For example, it is determined, by using a scene recognition model, that the scene category corresponding to the first image is a character poster.

In an example, a training process of the scene recognition model may include: obtaining a scene training sample set, where the scene training sample set includes a plurality of scene training samples, and each scene training sample includes a scene image identified with a scene category label. The scene training sample set is input into the to-be-trained model for training, and the training ends when a preset training condition is met. In this way, the scene recognition model can be obtained.

The preset training condition may be set according to an actual requirement. For example, the preset training condition may mean that a quantity of training times reaches a quantity threshold, or the preset training condition may mean that scene recognition accuracy of a trained model reaches an accuracy threshold.

The quantity threshold may be set by the user according to an actual requirement, or may be set by the electronic device by default. This is not limited in this embodiment of this application.

The accuracy threshold may be set by the user according to an actual requirement, or may be set by the electronic device by default. This is not limited in this embodiment of this application.

In an example, the to-be-trained model may be a classification network model. For example, the classification network model may be a model combining a mobilenetV3 and an SSD, that is, a model formed by using the mobilenetV3 as a network basis and using a structure of the SSD. Certainly, only an example in which the to-be-trained model is a model combining the mobilenetV3 and the SSD is used herein. In another embodiment, the to-be-trained model may be another classification network model. This is not limited in this embodiment of this application.

It should be noted that training of the scene recognition model may be performed by the electronic device, or may be performed by another device. Then, the trained scene recognition module is stored in the first processing unit of the electronic device.

Step 1704: Determine arrangement orders of the N objects in the first image according to the scene category of the first image and the object categories of the N objects in the first image.

Different scenes correspond to at least one scene intent weight. The scene intent weight of any object is used to indicate a probability that any object is searched in the scene of the first image, and at least one scene intent weight corresponding to each scene may be preset according to an actual requirement. For example, at least one scene intent weight corresponding to different scenes is shown in Table 2.

TABLE 2

| Scene category | Scene intent weight 1 | Scene intent weight 2 | Scene intent weight 3 | Scene intent weight n |
|---|---|---|---|---|
| Character poster | Star 1.0 | Shopping 0.9 | Object recognition 0.8 | ... |
| Landscape | Landmark 1.0 | Object recognition 0.6 | Star 0.5 | ... |
| Indoors | Shopping 1.0 | Object recognition 0.6 | Star 0.6 | ... |

Each search intent corresponds to an object category. The electronic device may determine at least one corresponding scene intent weight based on the scene category. In addition, the electronic device determines a corresponding search intent based on the object categories of the N objects in the first image, so as to determine the scene intent weight of each of the N objects. For example, it is assumed that the electronic device determines that the scene category of the first image is a "character poster", the N objects in the first image include a face, a mobile phone, and clothing, the object categories of the N objects include a person, a commodity, and a product, and corresponding search intents are respectively a star, shopping, and object recognition. In this case, it may be determined, according to Table 1, that scene intent weights of the objects are respectively 1.0, 0.9, and 0.8.

Then, the arrangement orders of the N objects may be determined based on the values of the scene intent weights of the N objects.

Step 1705: Feed back search results of some or all of the N objects according to the arrangement orders of the N objects.

In an embodiment, the electronic device screens, from the first image, an object whose scene intent weight is greater than the weight threshold, and determines the selected object as the search object.

The weight threshold may be set by the user according to an actual requirement, or may be set by the electronic device by default. This is not limited in this embodiment of this application.

Then, intent search is performed on the search objects in the first image to obtain search results, and the search results of the search objects are fed back. For specific implementation, refer to related content of step 905 in the embodiment shown in FIG. 9.

For example, the electronic device may sort search intents based on scene intent weights of the search objects. For example, it is assumed that the search objects include a face B and a mobile phone A, and the sorting result is: star and shopping. That is, a most probable search intent corresponding to the first image is star search, and then shopping, for example, purchasing a mobile phone in the first image. The scene intent weight of the star is higher than the scene intent weight of the shopping, that is, the arrangement order of the face B comes before the arrangement order of the mobile phone A. Therefore, in a process of feeding back search results, the search result of the face B is preferentially fed back. For example, the search result of the face B may be displayed before the search result of the mobile phone A.

In this embodiment of this application, the scene category of the first image is determined, and then search intent rankings of the search objects in the first image are determined based on the scene category, and the search results of the search objects in the first image are displayed based on the search intent rankings. In this way, the search result is combined with the scene, so that the search result is closer to the scene, and the search result is not separated from the scene of the first image, so that the search result displayed to the user is more suitable for the scene of the first image, and the search result that the user may be interested in is preferentially recommended to the user, thereby improving user experience.

It should be noted that the foregoing embodiments are described by using an example in which a related process of determining arrangement orders of objects in the method is independently implemented by one processing unit. As described above, in an embodiment, a related process of determining arrangement orders of objects in the method provided in this embodiment of this application may be implemented by any two of the foregoing three processing units, or may be implemented by a combination of the foregoing three processing units. The following describes specific implementation of the method provided in this embodiment of this application by using an example in which a combination of the three processing units is used for implementation.

Figure 18:
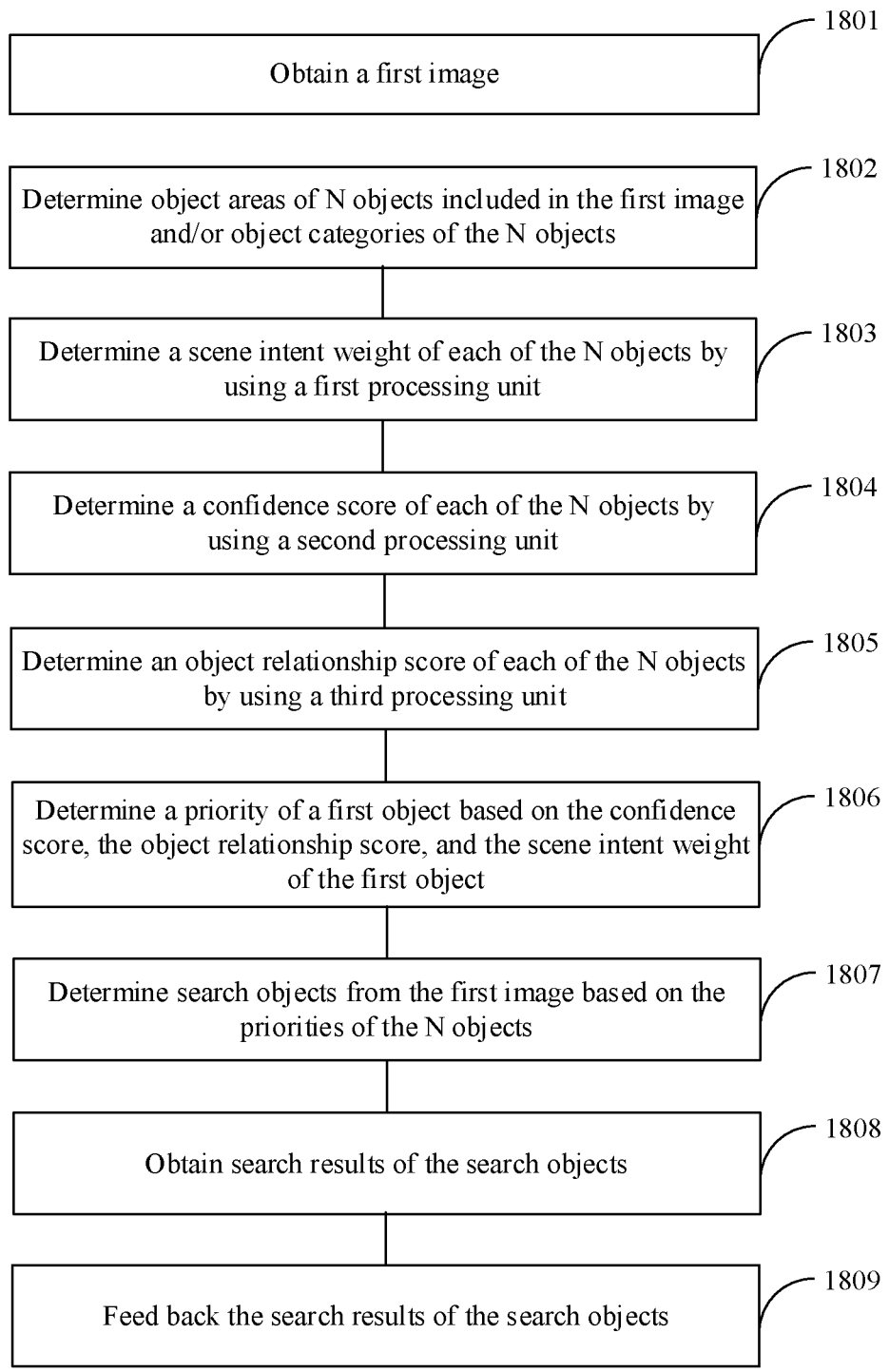
FIG. 18 is a schematic flowchart of another search result feedback method according to an embodiment of this application.

18. FIG. 18 is a schematic flowchart of a search result feedback method according to an embodiment of this application. The method may include some or all of the following content.

For step 1801 and step 1802, refer to step 901 and step 902 in the embodiment shown in FIG. 9.

Step 1803: Determine a scene intent weight of each of the N objects by using a first processing unit.

The scene intent weight is used to indicate a probability that a first object is searched in a scene of the first image, and the first object is any one of the N objects. For specific implementation thereof, refer to the embodiment shown in FIG. 9.

Step 1804: Determine a confidence score of each of the N objects by using a second processing unit.

The confidence score is a similarity between the first object and an image in the image library. For specific implementation thereof, refer to the embodiment shown in FIG. 14.

Step 1805: Determine an object relationship score of each of the N objects by using a third processing unit.

The object relationship score is used to indicate importance of the first object in the first image. For example, the object relationship score is determined based on a position importance value, or is determined based on a position importance value and an affiliation value. For specific implementation thereof, refer to the embodiment shown in FIG. 17.

It should be noted that the first processing unit, the second processing unit, and the third processing unit are not sequentially executed in the foregoing steps. In an embodiment, the first processing unit, the second processing unit, and the third processing unit may be concurrently executed.

Step 1806: Determine a priority of the first object based on the confidence score, the object relationship score, and the scene intent weight of the first object.

The priority of the first object corresponds to the arrangement order of the first object, that is, a higher priority of the first object indicates a higher arrangement order.

The first object is any one of the N objects, that is, the first object is used as an example for description herein. During implementation, the priority of each object is determined based on the confidence score, the object relationship score, and the scene intent weight of each object.

For example, assuming that the object relationship score is determined based on a position importance value and an affiliation value, S represents a scene intent weight, F represents a confidence score of an object, and L and H respectively represent the position importance value and the affiliation value of the object, a priority value of each object may be determined by using the following formula (2), where the priority value is used to indicate a priority:

$$f_n = xF_n + yL_n + kH_n + zS_{n\text{-}c\text{-}I} \qquad (2)$$

$f_n$ represents the priority value of the object n, $F_n$ represents the confidence score of the object n, $L_n$ represents the position importance value of the object n, $H_n$ represents the affiliation value of the object n, and $S_{n\text{-}c\text{-}I}$ represents the scene intent weight that is of the object category of the object n and that is in the first image. x, y, k, and z are preset values.

Step 1807: Determine search objects from the first image based on the priorities of the N objects.

The search objects include some or all of the N objects included in the first image.

Step 1808: Obtain search results of the search objects.

Step 1809: Feed back the search results of the search objects.

In this embodiment of this application, in a process of performing intent search based on the first image, the scene category of the first image is determined, the confidence score and the object relationship score of the objects in the first image are determined, then priorities of the objects are determined based on the scene intent weight corresponding to the scene category and the confidence scores and the object relationship scores of the object in the first image, and the objects in the first image are sorted and displayed based on the priorities, so that the search results of the objects that the user may be interested in can be displayed as much as possible, thereby improving accuracy of the intent search and improving user experience.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 19:
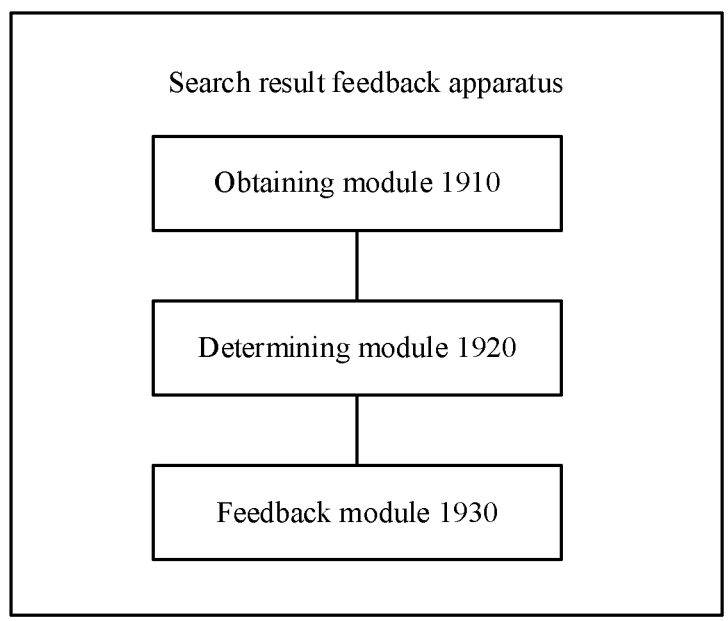
FIG. 19 is a schematic diagram of a structure of a search result feedback apparatus according to an embodiment of this application.

Corresponding to the search result feedback method in the foregoing embodiment, FIG. 19 is a block diagram of a structure of a search result feedback apparatus according to an embodiment of this application. For ease of description, only a part related to the embodiment of this application is shown.

As shown in FIG. 19, the apparatus includes:

an obtaining module 1910, configured to obtain a first image, where the first image includes M objects, and M is an integer greater than or equal to 2;

a determining module 1920, configured to: for N objects in the M objects, when N is greater than or equal to 2, determine arrangement orders of the N objects, where N is a positive integer less than or equal to M; and an arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image; and a feedback module 1930, configured to feed back search results of some or all of the N objects according to the arrangement orders of the N objects.

In an example in this application, the determining module 1920 is configured to:

perform image detection processing on the first image by using a target detection model, to obtain an object area of a first object in the first image and/or an object category of the first object, where the first object is any one of the N objects; and determine a confidence score of the first object based on the object area of the first object in the first image and the object category of the first object, and/or determine an object relationship score of the first object based on the object area of the first object in the first image, and/or determine a scene intent weight of the first object based on the object category of the first object.

In an example in this application, the determining module 1920 is configured to:

determine an image library corresponding to the object category of the first object;

determine a similarity between an object area of the first object in the first image and each of a plurality of images included in the image library; and use a maximum similarity in a plurality of determined similarities as the confidence score of the first object.

In an example in this application, the first image includes a plurality of areas, each of the plurality of areas has a preset score used to indicate position importance of the area, and preset scores of at least two of the plurality of areas are different; and the determining module 1920 is configured to:

determine a position importance value of the first object in the first image based on a preset score of each area included in the object area of the first object in the first image; and determine the object relationship score of the first object based on the position importance value of the first object.

In an example in this application, the determining module 1920 is configured to:

when the first image includes a reference object, obtain, based on the object area of the first object in the first image and an object area of the reference object in the first image, a distance between the first object and the reference object in the first image, and using the distance as an affiliation value of the first object; and determine the object relationship score of the first object based on the position importance value and the affiliation value that are of the first object.

In an example in this application, the determining module 1920 is configured to:

determine a scene category of the first image; and determine the scene intent weight of the first object based on the scene category of the first image, the object category of the first object, and a correspondence between the scene category, the object category, and the scene intent weight.

In an example in this application, quality scores of the N objects in the first image are higher than or equal to a quality score threshold, and a quality score of the any object is determined based on blurriness and/or integrity of the any object.

In an example in this application, the feedback module 1930 is configured to:

obtain object labels included in the search results of some or all of the N objects;

generate, based on the obtained object labels, inquiry information corresponding to some or all of the N objects, where the inquiry information is used to prompt whether information associated with the object label needs to be obtained; and display the inquiry information of some or all of the N objects according to the arrangement orders of the N objects, to feed back the search results of some or all of the N objects.

In an example in this application, the N objects include a second object and a third object, an arrangement order of the second object comes before an arrangement order of the third object, and a display order of a search result corresponding to the second object on the display comes before a display order of a search result corresponding to the third object on the display.

In this embodiment of this application, the first image is obtained, where the first image includes M objects, and M is an integer greater than or equal to 2. For the N objects in the M objects, when there are a plurality of N objects, determining arrangement orders of the N objects, and feeding back search results of some or all of the N objects according to the arrangement orders of the N objects. An arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image. In this way, the N objects are screened and sorted according to the arrangement orders of the N objects, so as to preferentially feed back, to a user, a search result of an object that has a good search result and that the user may be interested in, so that feedback is targeted to some extent, thereby improving accuracy of the search result that is finally fed back.

A person skilled in the art may clearly understand that for the purpose of convenient and brief descriptions, division into the foregoing functional unit or modules is merely used as an example for description. During actual application, the foregoing functions may be allocated to different functional unit or modules for implementation according to a requirement, that is, an internal structure of the apparatus is divided into different functional units or modules to implement all or some of the functions described above. Functional units or modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units or modules are merely for convenience of distinguishing from each other, and are not intended to limit the protection scope of this application. For specific working processes of units or modules in a system described above, refer to corresponding processes in the foregoing method embodiments. Details are not described herein again.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it should be understood that the disclosed apparatus and method may be implemented in other manners. For example, the described system embodiment is merely an example. For example, division of the modules or units is merely logical function division, and there may be another division manner in actual implementation. For example, a plurality of units or components may be combined or may be integrated into another system, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, all or some of the procedures of the method in the embodiments of this application may be implemented by a computer program instructing relevant hardware. The computer program may be stored in a computer-readable storage medium. When the computer program is executed by a processor, the steps in the foregoing method embodiments may be implemented. The computer program includes computer program code. The computer program code may be in a source code form, an object code form, an executable file form, some intermediate forms, or the like. The computer-readable storage medium may include at least any entity or apparatus that can carry computer program code to an electronic device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disc. In some jurisdictions, the computer-readable medium cannot be the electrical carrier signal or the telecommunication signal according to legislation and patent practices.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, wherein the method comprises:
    obtaining a first image, wherein the first image comprises M objects, and M is an integer greater than or equal to 2;
    for N objects in the M objects, when N is greater than or equal to 2, determining arrangement orders of the N objects, wherein N is a positive integer less than or equal to M, and wherein:
        an arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image; and
    feeding back search results of some or all of the N objects according to the arrangement orders of the N objects.

2. The method according to claim 1, wherein any one or more of the scene intent weight, the confidence score, or the object relationship score of any one of the N objects are determined in the following manner:
    performing image detection processing on the first image, by using a target detection model, to obtain an object area of at least one of a first object in the first image or an object category of the first object, wherein the first object is any one of the N objects; and at least one of:
        determining a confidence score of the first object based on the object area of the first object in the first image and the object category of the first object;
        determining an object relationship score of the first object based on the object area of the first object in the first image; or
        determining a scene intent weight of the first object based on the object category of the first object.

3. The method according to claim 2, wherein the determining a confidence score of the first object based on the object area of the first object in the first image and the object category of the first object comprises:
    determining an image library corresponding to the object category of the first object;
    determining a similarity between an object area of the first object in the first image and each of a plurality of images comprised in the image library; and
    using a maximum similarity in a plurality of determined similarities as the confidence score of the first object.

4. The method according to claim 2, wherein:
    the first image comprises a plurality of areas, each of the plurality of areas has a preset score used to indicate position importance of the area, and preset scores of at least two of the plurality of areas are different; and the determining an object relationship score of the first object based on the object area of the first object in the first image comprises:

determining a position importance value of the first object in the first image based on a preset score of each area comprised in the object area of the first object in the first image; and determining the object relationship score of the first object based on the position importance value of the first object.

5. The method according to claim 4, wherein before the determining the object relationship score of the first object based on the position importance value of the first object, the method further comprises:

when the first image comprises a reference object, obtaining, based on the object area of the first object in the first image and an object area of the reference object in the first image, a distance between the first object and the reference object in the first image, and using the distance as an affiliation value of the first object; and wherein the determining the object relationship score of the first object based on the position importance value of the first object comprises:

determining the object relationship score of the first object based on the position importance value and the affiliation value that are of the first object.

6. The method according to claim 2, wherein the determining a scene intent weight of the first object based on the object category of the first object comprises:

determining a scene category of the first image; and determining the scene intent weight of the first object based on the scene category of the first image, the object category of the first object, and a correspondence between the scene category, the object category, and the scene intent weight.

7. The method according to claim 1, wherein quality scores of the N objects in the first image are higher than or equal to a quality score threshold, and a quality score of the any object is determined based on at least one of blurriness or integrity of the any object.

8. The method according to claim 1, wherein the feeding back search results of some or all of the N objects according to the arrangement orders of the N objects comprises:

obtaining object labels comprised in the search results of some or all of the N objects;

generating, based on the obtained object labels, inquiry information corresponding to some or all of the N objects, wherein the inquiry information is used to prompt whether information associated with the object label needs to be obtained; and displaying the inquiry information of some or all of the N objects, according to the arrangement orders of the N objects, to feed back the search results of some or all of the N objects.

9. The method according to claim 1, wherein the N objects comprise a second object and a third object, an arrangement order of the second object comes before an arrangement order of the third object, and a display order of a search result corresponding to the second object on a display comes before a display order of a search result corresponding to the third object on the display.

10. A search result feedback apparatus, wherein the apparatus comprises:

at least one processor; and one or more memories coupled to the at least one processor and storing programming instructions for execution by the at least one processor to:

obtain a first image, wherein the first image comprises M objects, and M is an integer greater than or equal to 2;

for N objects in the M objects, when N is greater than or equal to 2, determine arrangement orders of the N objects, wherein N is a positive integer less than or equal to M, wherein:

an arrangement order of any one of the N objects is determined based on any one or more of a scene intent weight, a confidence score, and an object relationship score, the scene intent weight is used to indicate a probability that the any object is searched in a scene corresponding to the first image, the confidence score is a similarity between the any object and an image in an image library, and the object relationship score is used to indicate importance of the any object in the first image; and feed back search results of some or all of the N objects according to the arrangement orders of the N objects.

11. The apparatus according to claim 10, wherein the programming instructions are for execution by the at least one processor to:

perform image detection processing on the first image, by using a target detection model, to obtain an object area of at least one of a first object in the first image or an object category of the first object, wherein the first object is any one of the N objects; and at least one of:

determine a confidence score of the first object based on the object area of the first object in the first image and the object category of the first object;

determine an object relationship score of the first object based on the object area of the first object in the first image; or determine a scene intent weight of the first object based on the object category of the first object.

12. The apparatus according to claim 11, wherein the programming instructions are for execution by the at least one processor to:

determine an image library corresponding to the object category of the first object;

determine a similarity between an object area of the first object in the first image and each of a plurality of images comprised in the image library; and use a maximum similarity in a plurality of determined similarities as the confidence score of the first object.

13. The apparatus according to claim 11, wherein:

the first image comprises a plurality of areas, each of the plurality of areas has a preset score used to indicate position importance of the area, and preset scores of at least two of the plurality of areas are different; and the programming instructions are for execution by the at least one processor to:

determine a position importance value of the first object in the first image based on a preset score of each area comprised in the object area of the first object in the first image; and determine the object relationship score of the first object based on the position importance value of the first object.

14. The apparatus according to claim 13, wherein the programming instructions are for execution by the at least one processor to:

when the first image comprises a reference object, based on the object area of the first object in the first image and an object area of the reference object in the first image, obtain a distance between the first object and the reference object in the first image, and use the distance as an affiliation value of the first object; and determine the object relationship score of the first object based on the position importance value and the affiliation value that are of the first object.

15. The method according to claim 1, wherein the method further comprises:

for the N objects in the M objects, when N=1, directly feeding back a search result of the object.

16. A non-transitory computer-readable storage media comprising instructions which, when executed by one or more processors, cause the one or more processors to perform operations comprising:

obtaining a first image, wherein the first image comprises M objects, and M is an integer greater than or equal to 2;

for N objects in the M objects, when N is greater than or equal to 2, determining arrangement orders of the N objects, wherein N is a positive integer less than or equal to M, and wherein:

an arrangement order of any one of the N objects is determined based on any one or more of a scene intent weight, a confidence score, or an object relationship score, the scene intent weight is used to indicate a probability that the any object is searched in a scene corresponding to the first image, the confidence score is a similarity between the any object and an image in an image library, and the object relationship score is used to indicate importance of the any object in the first image; and feeding back search results of some or all of the N objects according to the arrangement orders of the N objects.

17. The non-transitory computer-readable storage media according to claim 16, wherein any one or more of the scene intent weight, the confidence score, or the object relationship score of any one of the N objects are determined in the following manner:

performing image detection processing on the first image, by using a target detection model, to obtain an object area of at least one of a first object in the first image or an object category of the first object, wherein the first object is any one of the N objects; and at least one of:

determining a confidence score of the first object based on the object area of the first object in the first image and the object category of the first object;

determining an object relationship score of the first object based on the object area of the first object in the first image; or determining a scene intent weight of the first object based on the object category of the first object.

18. The non-transitory computer-readable storage media according to claim 17, wherein the determining a confidence score of the first object based on the object area of the first object in the first image and the object category of the first object comprises:

determining an image library corresponding to the object category of the first object;

determining a similarity between an object area of the first object in the first image and each of a plurality of images comprised in the image library; and using a maximum similarity in a plurality of determined similarities as the confidence score of the first object.

19. The non-transitory computer-readable storage media according to claim 17, wherein:

the first image comprises a plurality of areas, each of the plurality of areas has a preset score used to indicate position importance of the area, and preset scores of at least two of the plurality of areas are different; and the determining an object relationship score of the first object based on the object area of the first object in the first image comprises:

determining a position importance value of the first object in the first image based on a preset score of each area comprised in the object area of the first object in the first image; and determining the object relationship score of the first object based on the position importance value of the first object.

20. The non-transitory computer-readable storage media according to claim 19, wherein before the determining the object relationship score of the first object based on the position importance value of the first object, the operations further comprise:

when the first image comprises a reference object, obtaining, based on the object area of the first object in the first image and an object area of the reference object in the first image, a distance between the first object and the reference object in the first image, and using the distance as an affiliation value of the first object; and wherein the determining the object relationship score of the first object based on the position importance value of the first object comprises:

determining the object relationship score of the first object based on the position importance value and the affiliation value that are of the first object.

* * * * *

UNITED STATES PATENT AND TRADEMARK OFFICE
CERTIFICATE OF CORRECTION

PATENT NO. : 12,259,922 B2  
APPLICATION NO. : 18/548039  
DATED : March 25, 2025  
INVENTOR(S) : Lei Hao et al.

Page 1 of 1

It is certified that error appears in the above-identified patent and that said Letters Patent is hereby corrected as shown below:

In the Claims

In Column 44, In Line 9 (Approx.), In Claim 10, delete "Nis" and insert -- N is --.

Signed and Sealed this  
Twenty-second Day of July, 2025

Coke Morgan Stewart  
*Acting Director of the United States Patent and Trademark Office*